United States Patent [19]

Herron et al.

[11] Patent Number: 5,196,993

[45] Date of Patent: * Mar. 23, 1993

[54] REMOVABLE STAND ALONE DISPLAY FOR LAPTOP COMPUTER

[75] Inventors: Matthew A. Herron; Dennis J. Boyle, both of Menlo Park, Calif.

[73] Assignee: Unisys Corp., Detroit, Mich.

[*] Notice: The portion of the term of this patent subsequent to Dec. 19, 2007 has been disclaimed.

[21] Appl. No.: 684,755

[22] Filed: Apr. 15, 1991

Related U.S. Application Data

[62] Division of Ser. No. 319,157, Mar. 6, 1989, Pat. No. 5,028,025.

[51] Int. Cl.⁵ .......................... H05K 7/10; G06F 1/00
[52] U.S. Cl. ..................................... 361/393; 361/380; 248/923; 312/107
[58] Field of Search ................ 364/708; 248/454, 185, 248/917, 918, 919, 921, 922, 923; 361/380, 392, 393, 394, 395, 399; 312/107; 340/700, 711, 784

[56] References Cited

U.S. PATENT DOCUMENTS

| | | | |
|---|---|---|---|
| 4,528,597 | 7/1985 | Klein et al. | 358/254 |
| 4,624,434 | 11/1986 | Lake, Jr. et al. | 248/454 |
| 4,683,465 | 7/1987 | Lake, Jr. et al. | 340/700 |
| 4,749,364 | 6/1988 | Arney et al. | 364/708 X |
| 4,926,365 | 5/1990 | Hsieh | 364/708 |
| 4,971,406 | 11/1990 | Hanson | 340/711 |
| 4,978,949 | 12/1990 | Herron et al. | 340/711 |

FOREIGN PATENT DOCUMENTS 3143932  5/1983  Fed. Rep. of Germany ...... 358/254

OTHER PUBLICATIONS

IBM Technical Disclosure Bulletin, Mar. 1987, vol. 29, No. 10, pp. 4273-4274, "Removable Liquid Crystal Display For a Personal Computer".

Primary Examiner—Leo P. Picard
Assistant Examiner—Michael W. Phillips
Attorney, Agent, or Firm—John J. McCormack; Mark T. Starr

[57] ABSTRACT

A portable computer having a base housing and a removable display pivotably mounted thereon, the display being removable from the base housing to be made free-standing on pivotable support feet, while having a removable electrical cable to the base housing.

20 Claims, 16 Drawing Sheets

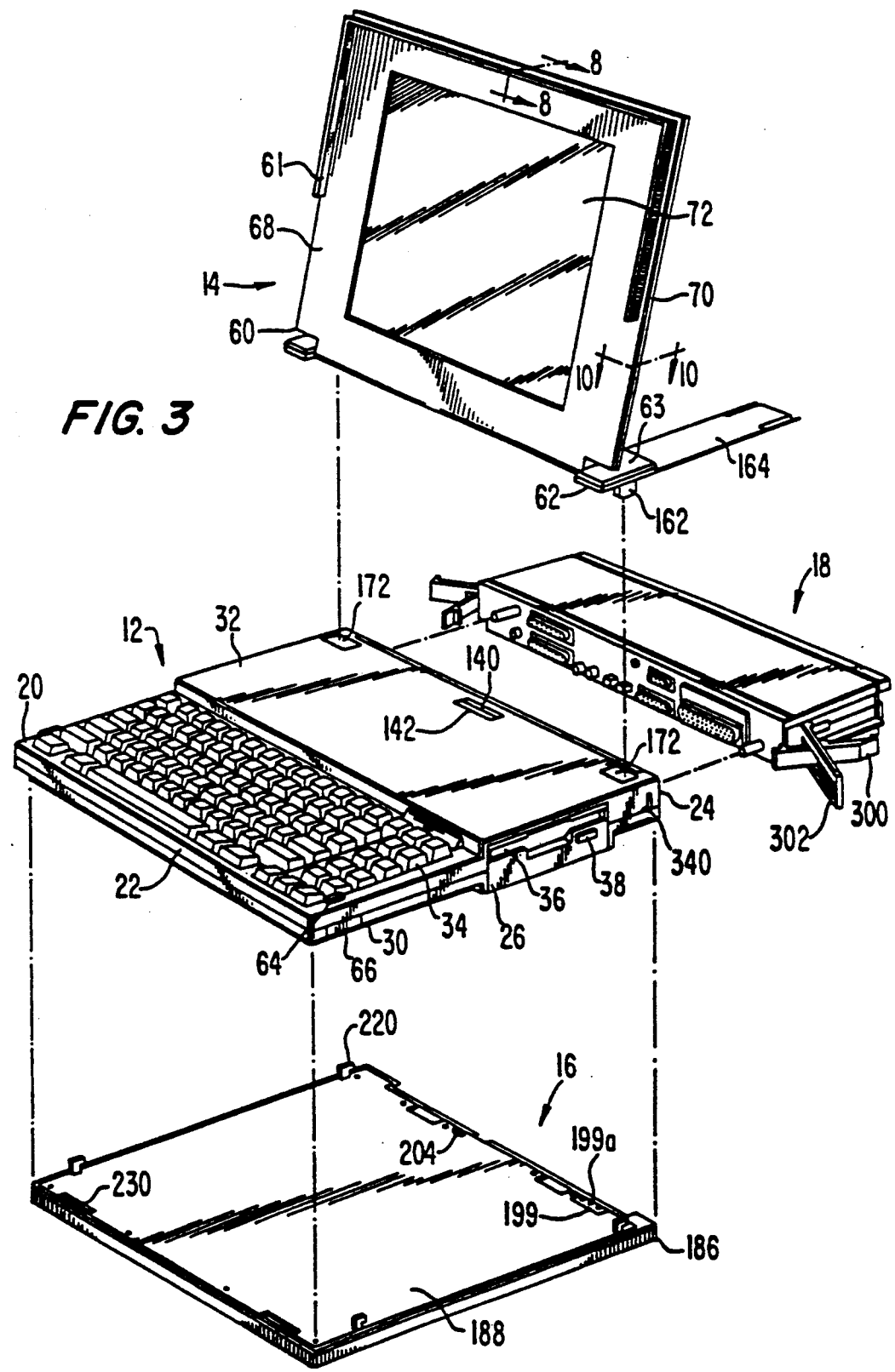

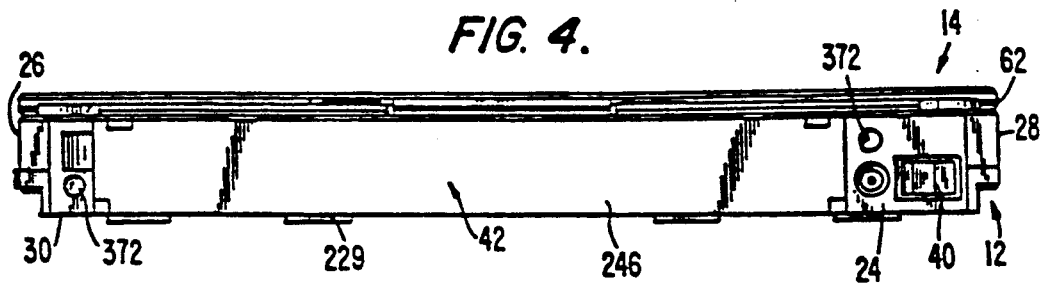
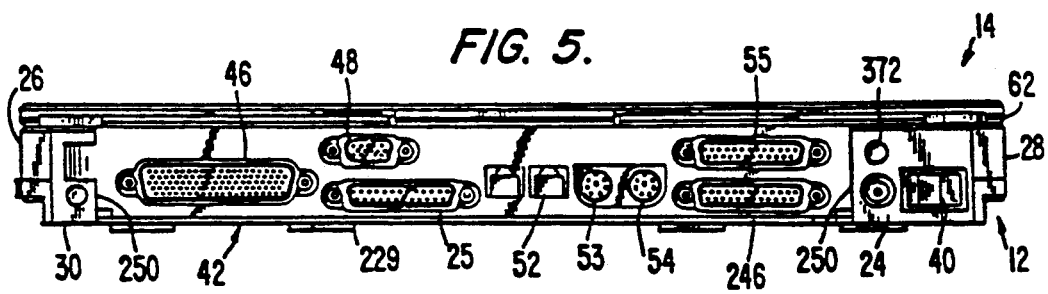
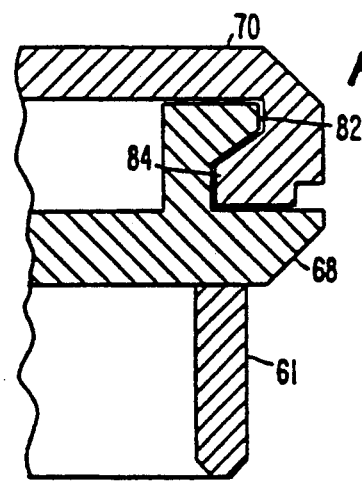
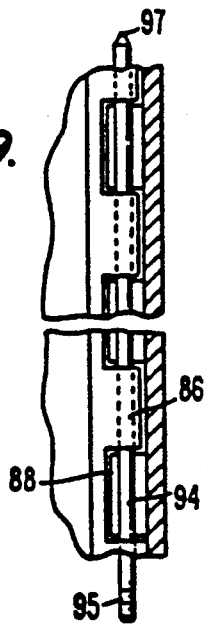
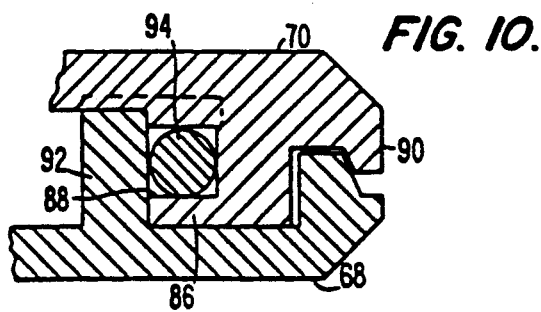

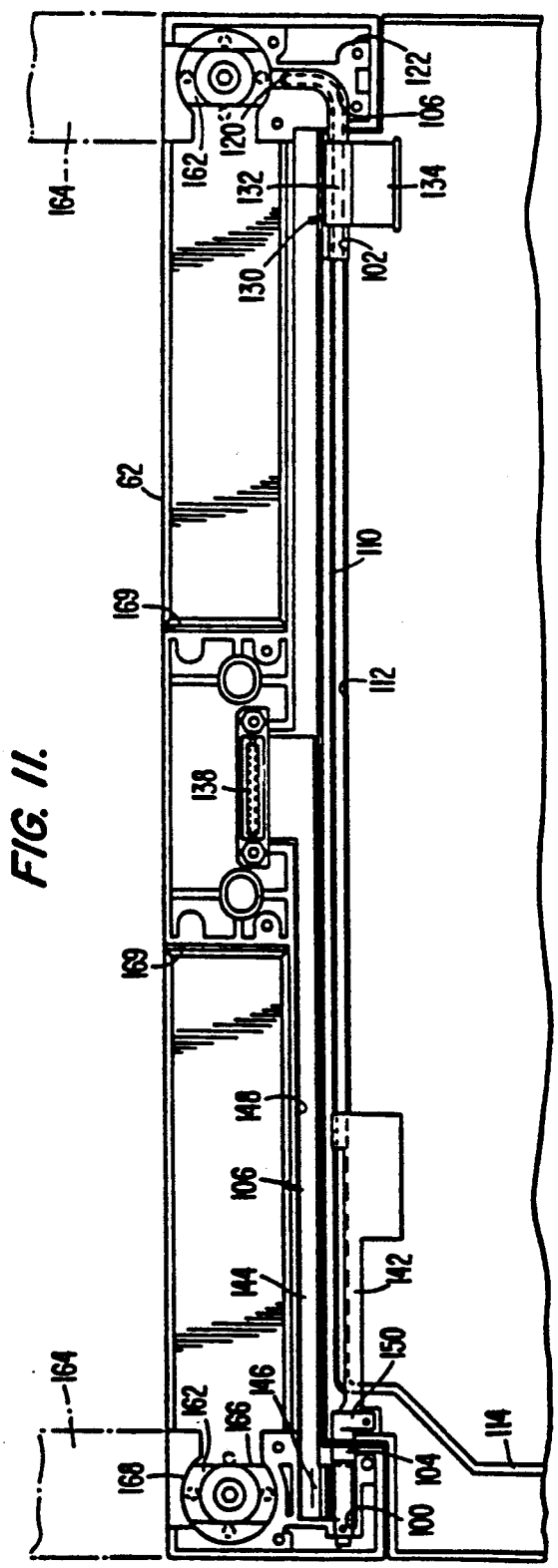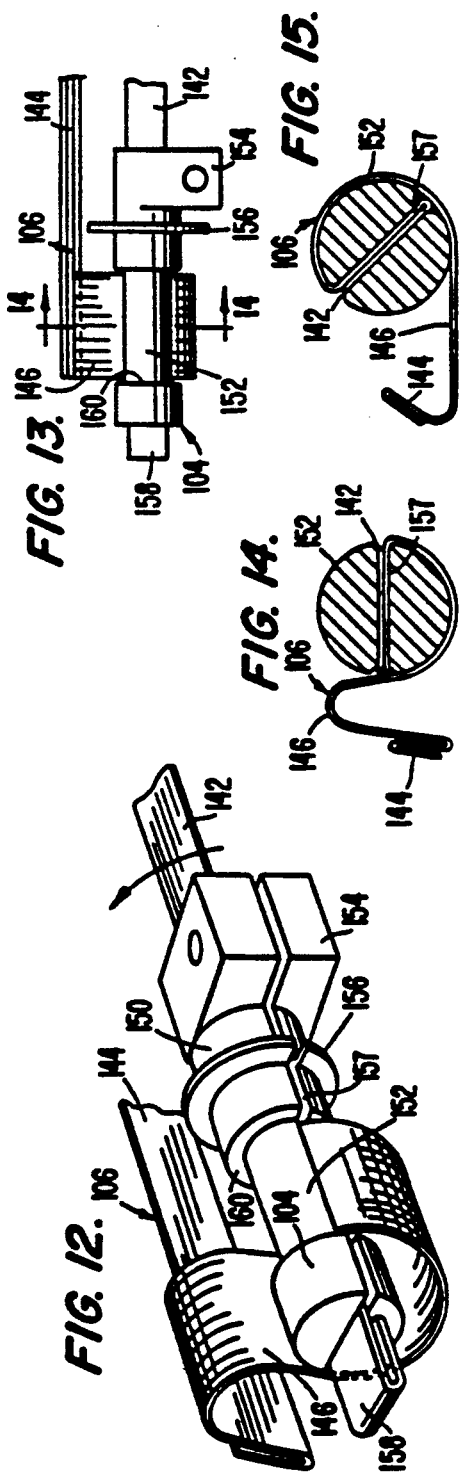

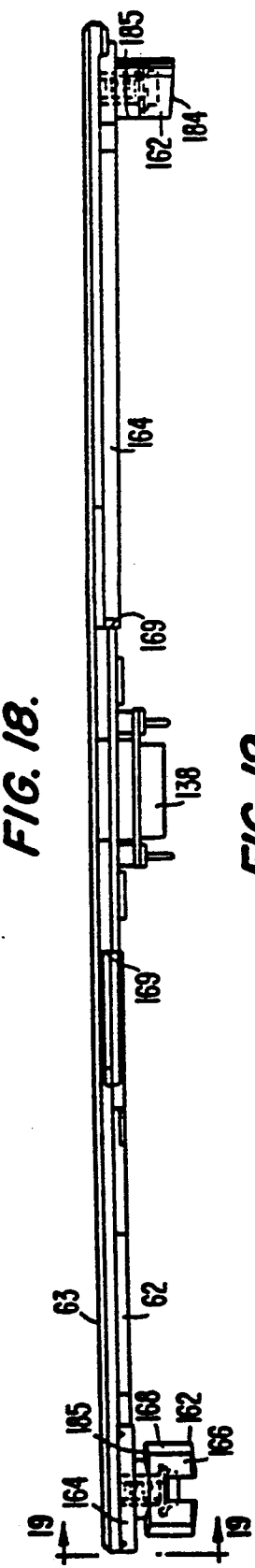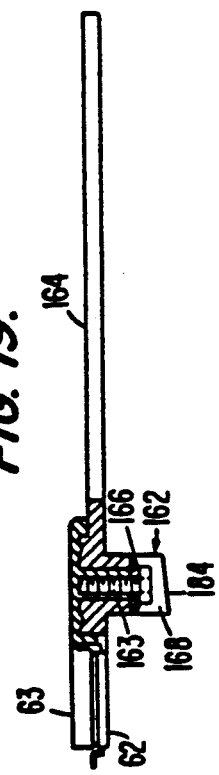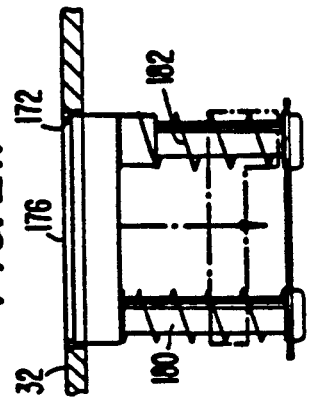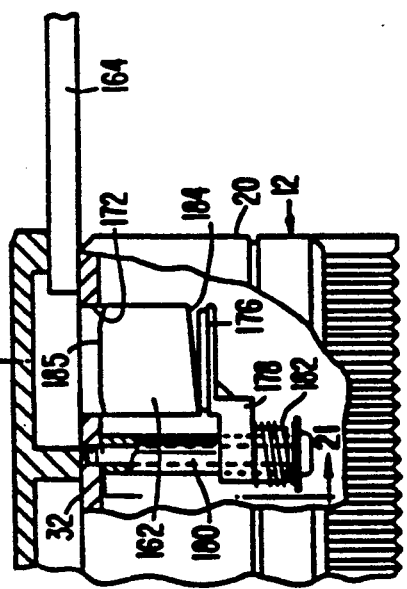

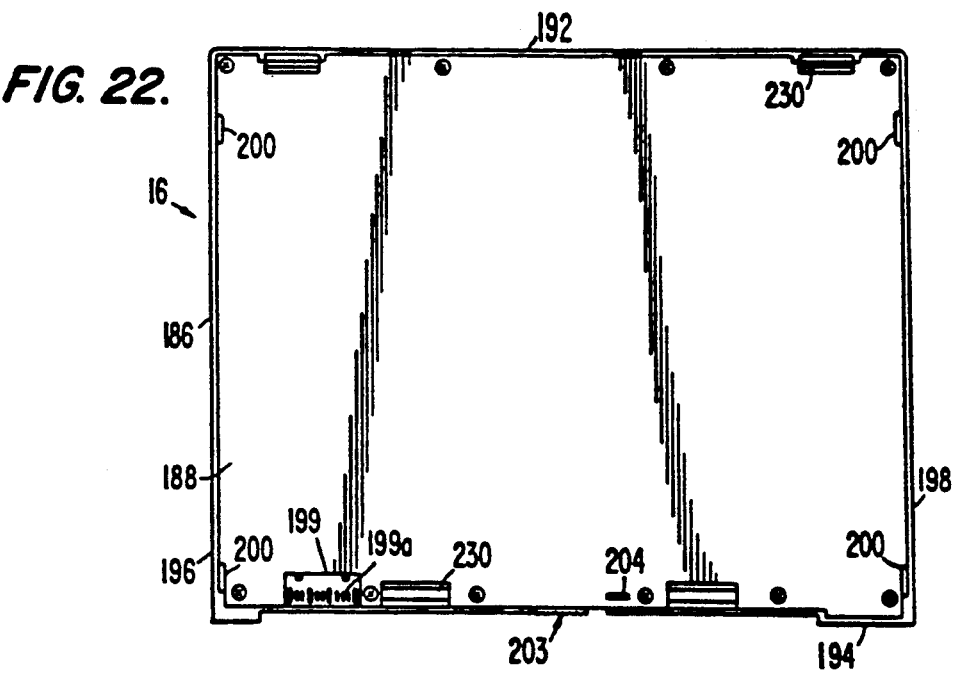
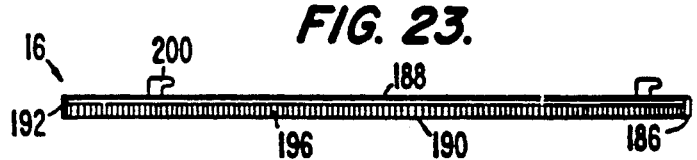
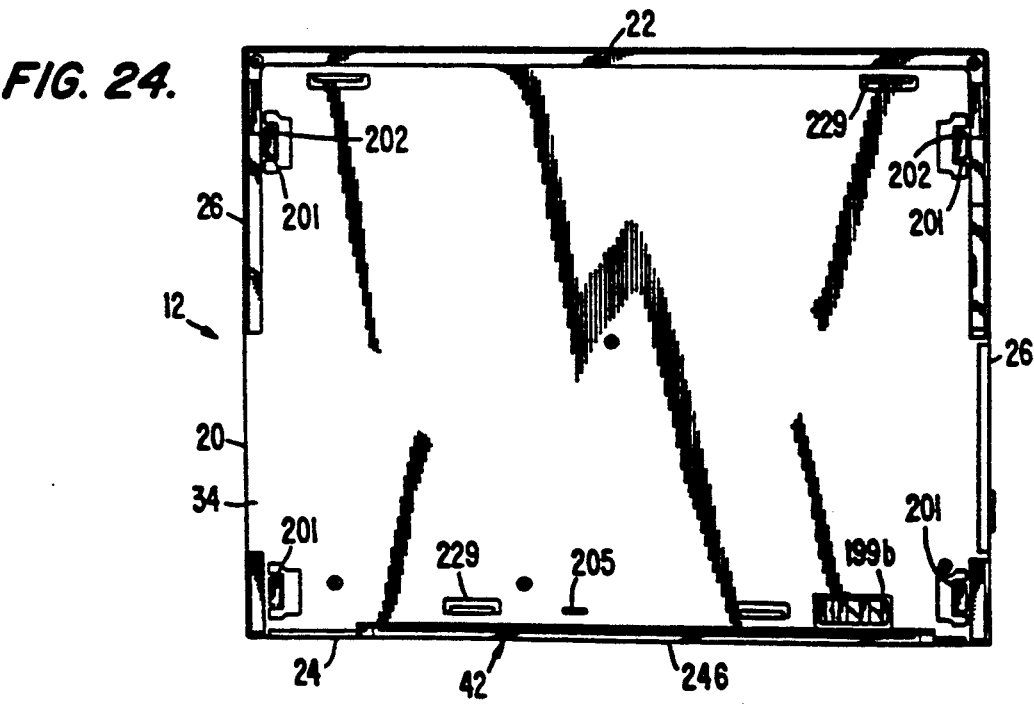

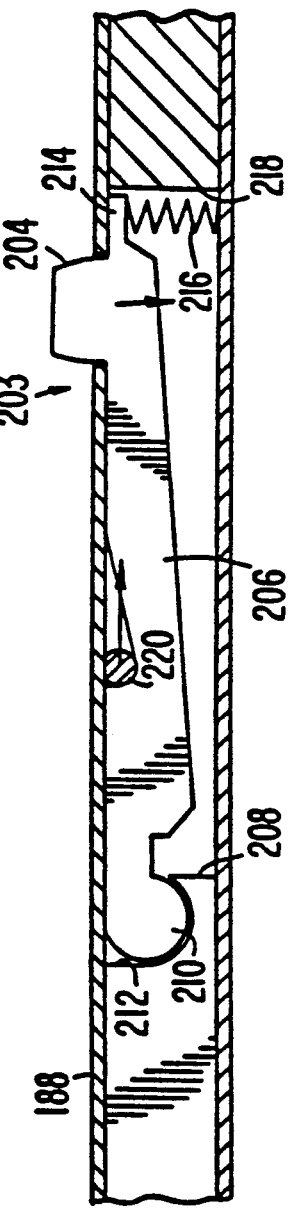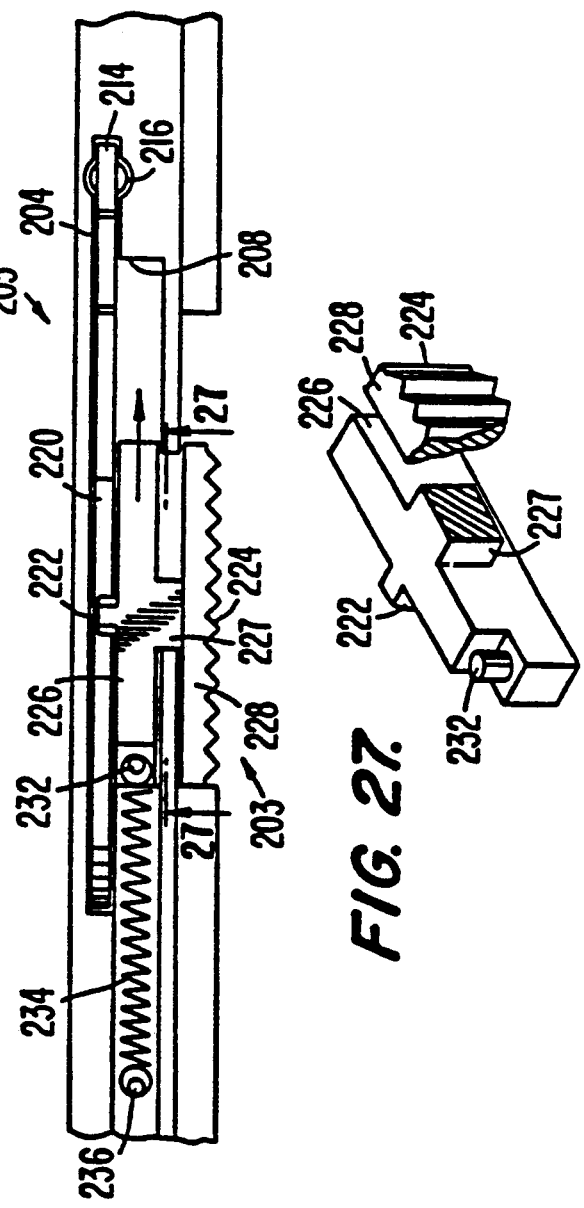

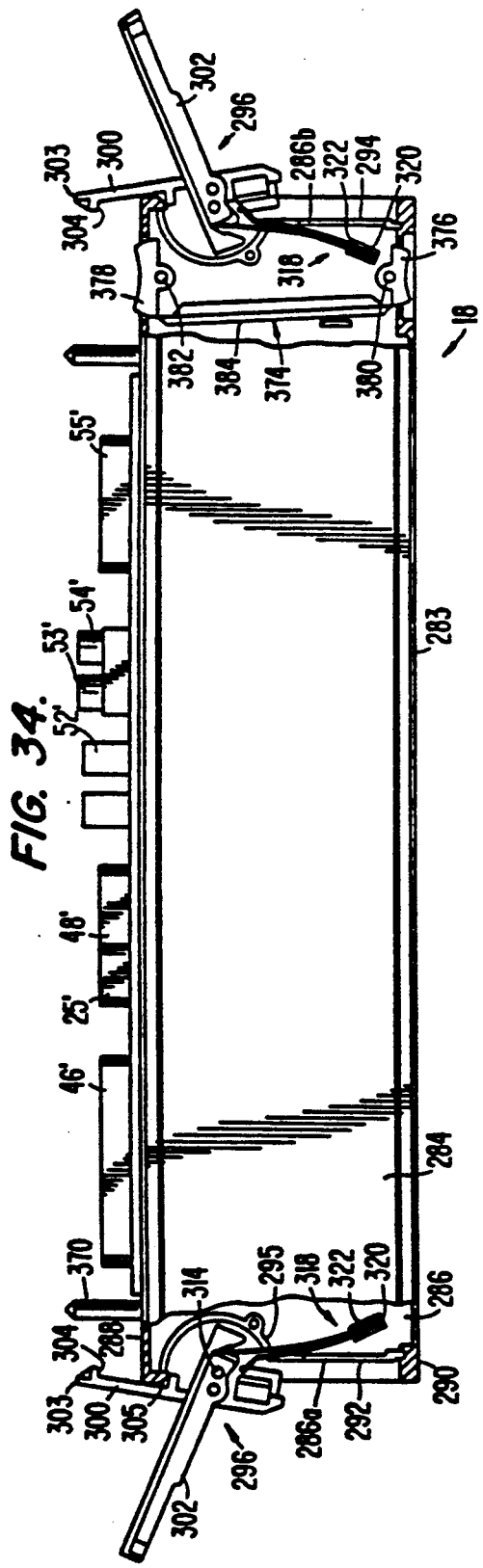
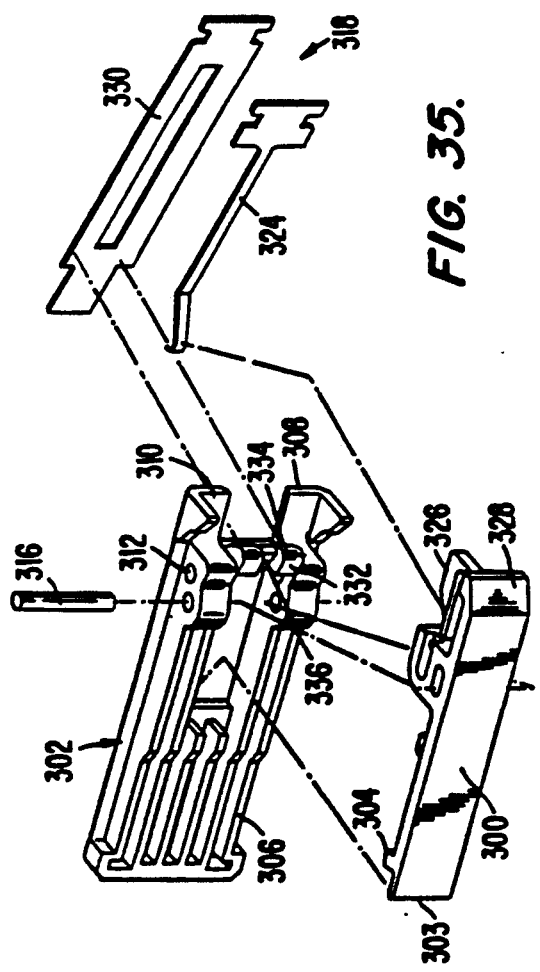

REMOVABLE STAND ALONE DISPLAY FOR LAPTOP COMPUTER

This is a division, of application Ser. No. 07/319157 filed Mar. 6, 1989, now U.S. Pat. No. 5,028,025.

FIELD OF THE INVENTION

The present invention relates to personal computer apparatus. More particularly, the invention concerns portable computer apparatus of the type commonly termed, "lap-top" computers.

BACKGROUND OF THE INVENTION

Lap-top computers are characterized by design demands that are unique as compared with personal or other computers of conventional design. Most importantly, in addition to being durable, they must be of compact construction in order that they will be sufficiently small and of light weight to enable their being readily carried, held and manipulated for lap-top use. Also, due the portable nature of the apparatus, recognition must be given to the fact that the computer will be employed in locations presenting diverse positional requirements and operational demands that must be accommodated. Furthermore, it is desirable that such apparatus be sufficiently versatile in design as to enable utilization also as a desk top apparatus. Consequently, the apparatus must be readily convertible from one form of apparatus to the other.

The development of a computer apparatus capable of satisfying the above demands has been difficult to achieve, in part due to an inability to arrive at compact mechanism for enabling the graphics display housing to be adjustably positioned in various angularly spaced positions to an extent necessary to permit use of the apparatus in various locations and under diverse lighting conditions. For example, in U.S. Pat. Nos. 4,624,434 and 4,683,465 granted on Nov. 25, 1986 and Jul. 28, 1987, respectively, to delicate and exposed elements of the combination, i.e., the movable keys, is more prone to damage thereby rendering it undesirable to permit it to be frequently moved when the keys are exposed.

It is to the amelioration of this problem therefore, to which the present invention is directed.

SUMMARY OF THE INVENTION

Accordingly, there is provided a lap top computer apparatus the design of which incorporates features that are embodied int he following patent applications that are filed concurrently herewith and that are assigned to the assignee hereof. These applications include:

Ser. No. 07/319,199 for "Display Fastening Rods", now abandoned;

Ser. No. 07/319,157 for "Torsion Bar and Band Brake", now U.S. Pat. No. 5,028,025;

Ser. No. 07/319,156 for "Contact Strip-to-Flex Bushing Connector", now U.S. Pat. No. 4,986,763;

Ser. No. 07/319,179 for "Locking Arrangement for Battery Pack", now U.S. Pat. No. 5,019,465;

Ser. No. 07/319,180 for "Three-Position Closure Panel", now U.S. Pat. No. 4,958,889; and Ser. No. 07/319,200 for "Docking Module"; now U.S. Pat. No. 5,030,128.

Accordingly, the present invention provides for a computer apparatus adapted for utility either as a portable, lap-top apparatus or, alternatively, as a desk-top installation. The apparatus includes a display assembly that is organized for utilization with the central processing unit while either directly connected thereto or detached and positioned remotely therefrom. The display assembly incorporates locking apparatus comprising lever-operated, cam-actuated locking members which, in one position, effectively and to the base, respectively, and wherein the torsion rod contains a torsional prestress effective to counterbalance the gravitational effect of the pivotable member in its respective angular positions. A friction brake operates with the described organization to retain the housing in its respective angular positions.

Consequently, by equipping the display housing of a lap-top computer with the particular pivot control apparatus, the display housing can be maintained in any one of an unlimited number of angular positions within a prescribed range, thereby enabling the user to utilize the apparatus with the display disposed in any angular position. The user can thereby adjust the display in order to satisfy demands of comfort or, alternatively, the display can be adjusted to eliminate glare or otherwise compensate for prevailing light conditions in the computer's locus of use. As a result of the latter capability, therefore, the light demands imposed on the computer are significantly reduced thereby permitting use in the display of a liquid crystal display medium which enhances the compactness of this overall housing assembly.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 3 is an exploded isometric representation of the personal computer apparatus of FIG. 1 illustrating the principal subassemblies thereof;

FIG. 4 is a rear elevational view of the computer chassis with the rear closure panel closed;

FIG. 5 is a rear elevational view similar to FIG. 4 but showing the rear closure panel horizontal;

FIG. 8 is an enlarged partial sectional view of the display housing taken along line 8—8 of FIG. 3;

FIG. 9 is a partial plan view of the display housing;

FIG. 10 is an enlarged partial sectional view of the display housing taken along line 10—10 of FIG. 3;

FIG. 11 is a partial plan view of the display base and display housing with the backing covers removed;

FIG. 12 is an enlarged isometric view of the circuit strip and connector employed in the computer display;

FIG. 13 is a partial plan view of the circuit strip and connector of FIG. 12;

FIG. 14 is a partial sectional elevational view of the circuit strip and connector taken along line 14—14 of FIG. 13;

FIG. 15 is a partial sectional elevational view similar to FIG. 14 showing the condition of the circuit strip and connector with the display housing in the closed position;

FIG. 18 is a front elevational view of the computer display base;

FIG. 19 is a side elevational view, partly in section, of the computer display base taken along line 19—19 of FIG. 18;

FIG. 20 is an enlarged side elevational view, partly in section, illustrating the computer display mounting connection to the chassis;

FIG. 21 is view taken along line 21—21 of FIG. 20;

FIG. 22 is a top plan view of the battery pack;

FIG. 23 is a side elevational view of the battery pack;

FIG. 24 is a bottom plan view of the computer chassis;

FIG. 25 is an enlarged partial elevational view, partly in section, illustrating the battery pack latch mechanism;

FIG. 26 is a partial top plan view of the latch mechanism of FIG. 25;

FIG. 27 is an isometric view of the latch mechanism actuator slide;

FIG. 34 is a plan view of the docking module with parts broken away to illustrate the toggle latching mechanisms;

FIG. 35 is an exploded isometric view illustrating the principal components parts of a toggle latching mechanism utilized with the docking module of FIG. 32;

DESCRIPTION OF A PREFERRED EMBODIMENT

Figure 1:
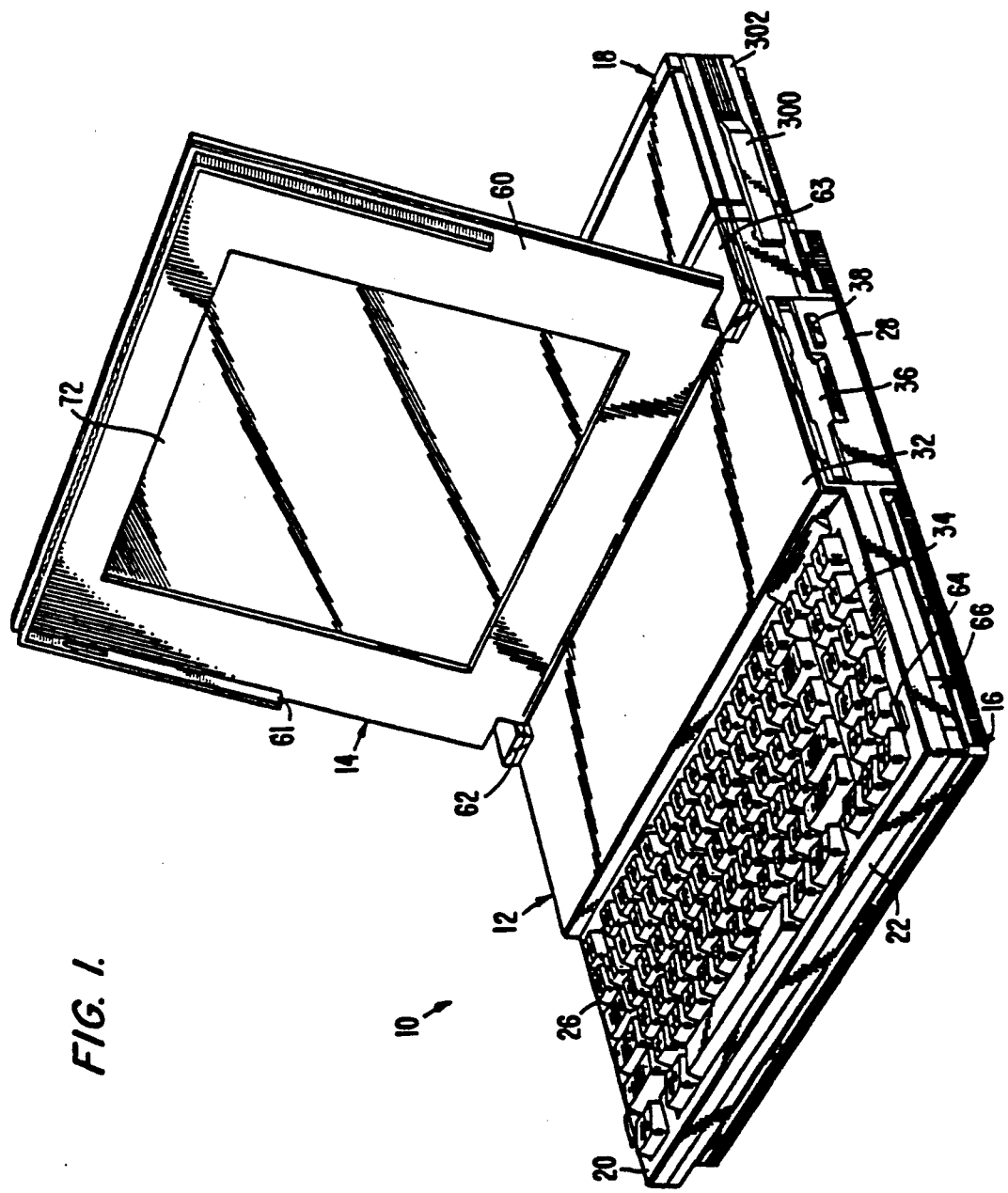
FIG. 1 is an isometric representation of a personal computer apparatus incorporating the present invention.
Figure 2:
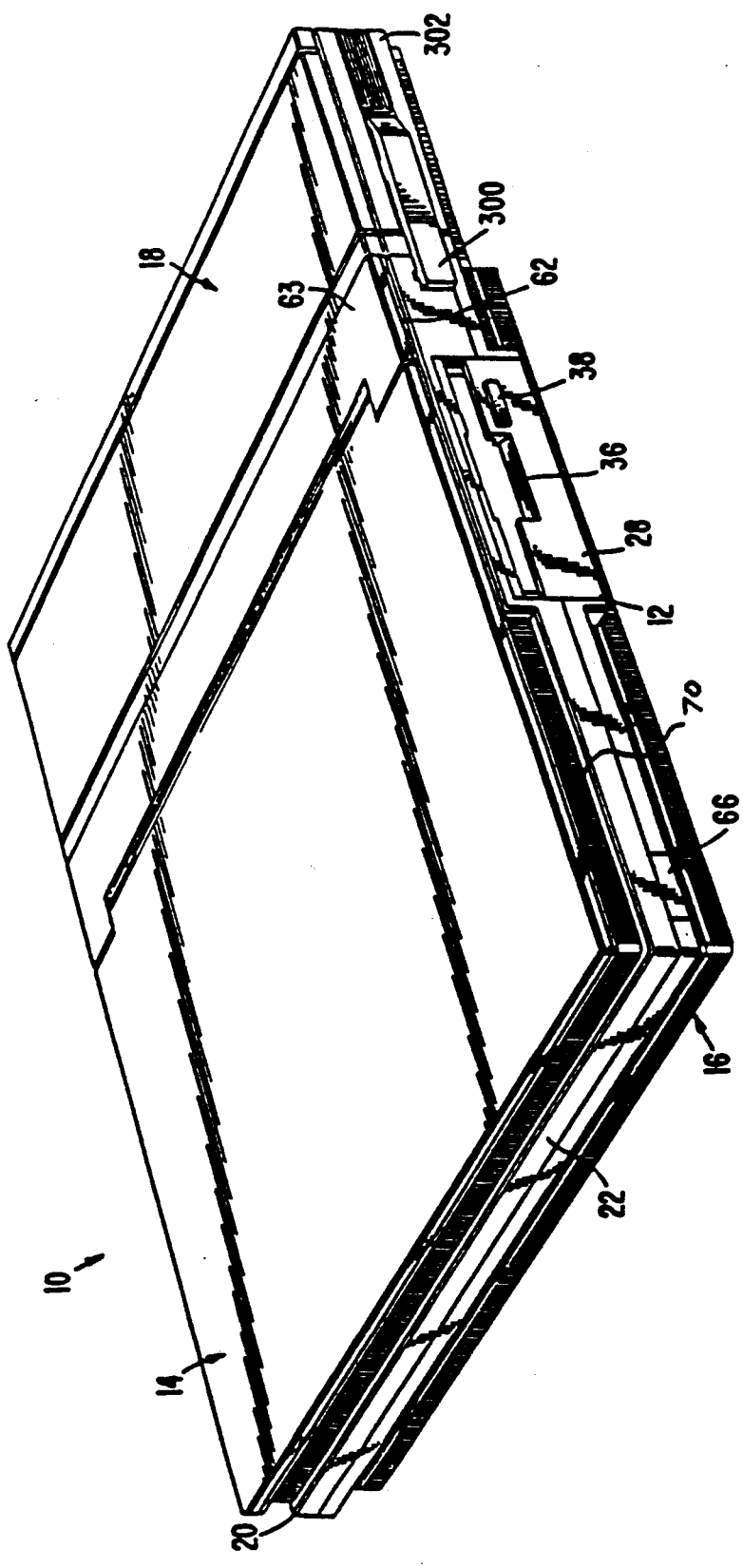
FIG. 2 is an isometric representation of the personal computer apparatus of FIG. 1 in the closed condition.

With particular reference to FIGS. 1 and 2 of the drawings there is shown a computer apparatus 10 particularly adapted for utilization alternately as a portable, so-called lap-top computer, or as a desk-top computer. The computer organization comprises four main sub-assemblies; namely a central processing unit (CPU) 12, a display 14, a battery pack 16 and a docking module 18. The display 14 is mounted for pivotal movement with respect to the CPU 12 and, as shown in FIG. 2, when closed forms part of the computer enclosure structure. As explained in greater detail hereinafter, each of the sub-assemblies, including the display 14, the battery pack 16 and the docking module 18 is detachable from the CPU 12 in order to enhance the versatility of application of the computer apparatus 10.

Central Processing Unit (CPU)

The CPU 12 comprises a metal casing structure forming a chassis or housing 20 containing a plurality of components, many of which are not germane to the present invention, as for example, data processing means, such as one or more microprocessor or microcomputer chips; a small random access memory; and means for electrically connecting the various components of the computer. Electric power to the computer is derived from the battery pack 16 during the lap-top mode of operation, while, for operating during the desk-top mode, power can be input from a house source of electric power.

The chassis 20 is formed of generally rectangularly positioned front and rear walls 22 and 24 and left and right side walls, 26 and 28, respectively, that extend between, and interconnect, a bottom wall 30 and a top wall 32. As shown best in FIG. 1, the top wall 32 has a stepped configuration containing a keyboard 34 in the forward portion thereof and mounting the display 14 at a slightly elevated position in the rearward portion. A disc access opening 36 is disposed in the right side wall 28 with a depressible disc release actuator 38 conveniently located adjacent thereto.

The rear side wall 24 of the chassis 20 (FIG. 4) is provided with a pivotally mounted single pole power switch 40 located adjacent the left side wall 26. Adjacent the switch 40 and closed by a closure cover 42 is a region 44 in which the connectors for various peripheral equipment are contained. Such connectors include various female connectors, 46 through 54, having multiple prongs for connection with mating connectors of individual pieces of peripheral equipment, or with an assemblage of such connectors, such as contained in the docking module 18, discussed in detail hereinafter.

The bottom surface 34 of the CPU 12 may be provided with a plurality of resilient feet 229 to cushion engagement of the chassis 20 with a support surface when the battery pack 16 is removed.

Display

As is well known, the display 14 in such apparatus provides the output of computer graphics to the operator. In the described organization the display 14 is of the liquid crystal-type being contained in a display housing 60. The display housing 60 is connected to the rearward portion of the top wall 32 of the CPU 12 via a base or jamb 62 that is adapted for releasable attachment to the CPU. The display housing 60 is connected to the base 62 for pivotal movement between a position, shown in FIG. 2 as being essentially horizontal, in which the housing effectively covers and encloses, via a skirt 61, the computer top wall 32 in order to protect the keyboard 34. From the horizontal attitude the housing 60 is pivotable to a maximum angularly extended position for graphics display, shown in FIG. 1 to be approximately 135 degrees angularly displaced from the first position. Position control means, as described hereinafter, enable the display housing 60 to be retained in any angular position between the horizontal position and its maximum extended position. Releasable latches 64, each having an associated actuator 66, are retained in the left and right side walls, 26 and 28, for releasably securing the display housing 60 in its closed position.

Figure 6:
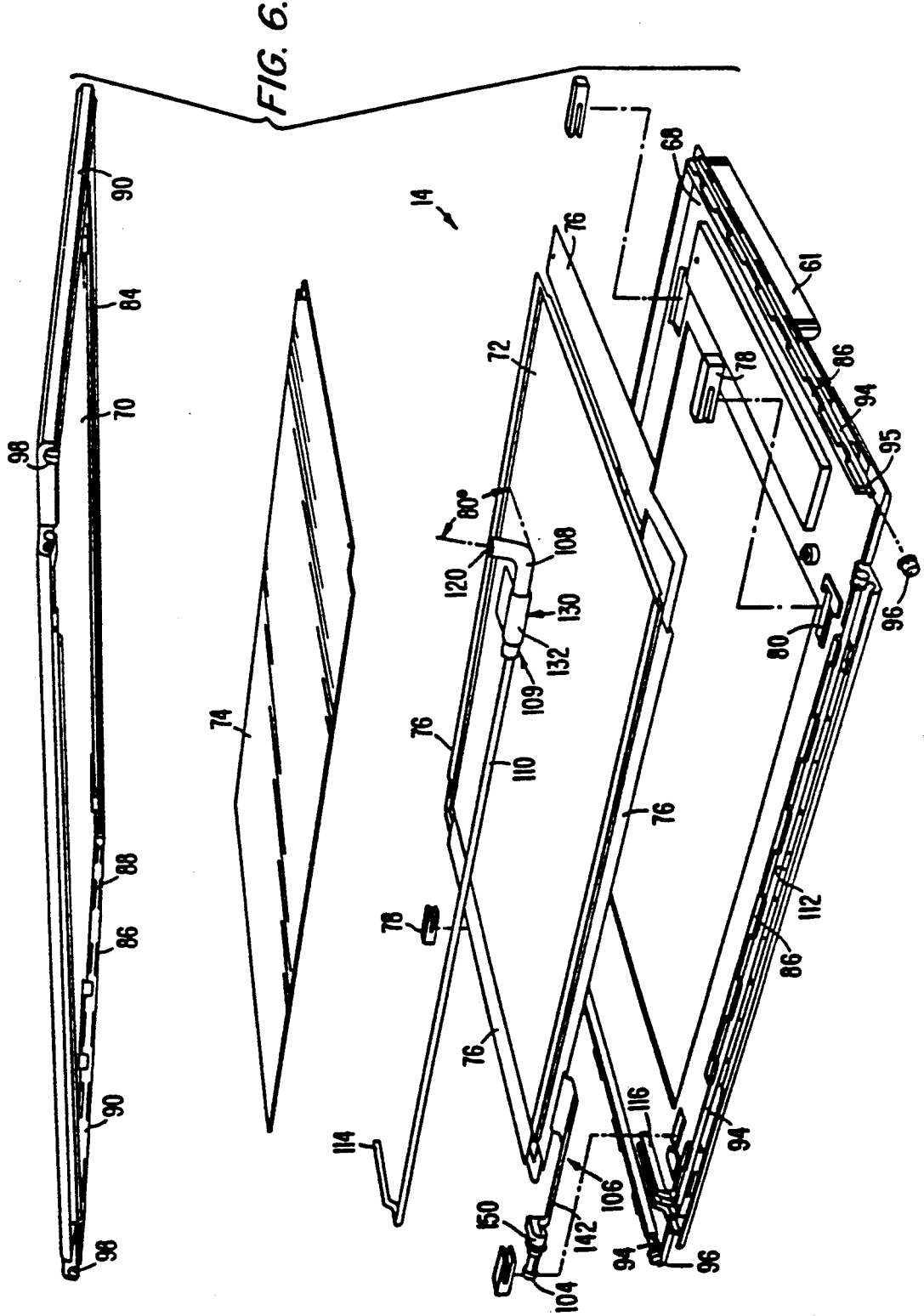
FIG. 6 is an exploded isometric view of the computer display.

With reference to FIG. 6 the display housing 60 comprises an assembly of oppositely disposed metal panels formed of cast aluminum or magnesium-alloy and including front panel 68 and rear panel 70. Interposed between the panels 68 and 70 in sandwiched relation thereto, are a forwardly positioned liquid crystal display (LCD) plate 72 and an electric luminescent panel 74 therebehind. Surrounding the LCD plate 72 are rectangularly arranged printed circuit boards 76 that form part of the electrical connection between the CPU 12 and the display 14. The sub-assembly consisting of the plate 72 and circuit boards 76 are resiliently cushioned by generally U-shaped shock mounts 78 disposed substantially at the intersecting corners of the sub-assembly and adapted to be received into seats 80 integrally formed on the interior surface of the front panel 68.

The panels 68 and 70 that form the display housing 60 are retained in assembled relation by a connection arrangement that comprises the interengagement of oppositely directed lips 82 and 84 (FIG. 8) that extend along the longitudinal edges of the respective panels that form the upper or free side of the display 14. The connection arrangement further includes along each of the remaining three sides of the housing 60 the provision on the oppositely facing, interior surfaces of the front and rear panels 68 and 70 of alternately spaced projections 86 containing longitudinal recesses 88. The projections 86 on the rear panel 70 are integrally formed along the inturned panel edge 90 to face inwardly therefrom. The projections 86 on the front panel 68, however, are formed as part of an integrally formed strip 92 spaced inwardly from the panel edge and upstanding from the interior surface of the panel with the projections 86 being disposed on the outwardly facing side of the strip.

The projections 86 on the respective panels are on alternate spacing and organized to be mutually interfitting when the panels are brought together in assembled relation. The recesses 88 in the respective projections 86, moreover, are so arranged as to be axially aligned upon assembly of the panels so as to form an elongated opening for reception of a straight, elongated fastening pin 94. The fastening pins 94 are of a diameter to be snugly received in the elongated opening formed by the aligned recesses 88. The pins 94, at their rear ends, are provided with threads 95 that permit them to be attached to a tool (not shown) by which they can be rotated as they are inserted into their associated elongated opening. Rotating the pins in this manner facilitates their insertion and extension along the elongated openings. To further facilitate passage of the pins 94 through these openings their leading ends may be pointed as shown at 97 in FIG. 9.

In order to improve the appearance of the assembly about the locus of the terminal end of each pin 94 a closure plug 96 may be installed to cover the threaded end of each pin 94 by resilient engagement with the wall of a counterbore 98 formed in the panels. The plugs 96 are each sized to substantially fill the respective counterbores 98 and are located at the bottom ends of the respective side edges of the display housing 60 and at one end along the bottom or pivot side of the housing. These openings 98, as shown, are formed by semi-cylindrical segments in the respective panels 68 and 70 and are completed when the panels are brought together upon assembly.

When it is desired to disassemble the housing 60, the closure plugs 96 are first removed from the respective openings 98 and the aforementioned tool threadedly attached to the end of the respective fastening pins 94 for their withdrawal from the openings in which they are disposed. Following withdrawal of the pins 94, the panels 68 and 70 can be manipulated with respect to each other thereby disengaging the lips 82 and 84 and permitting the panels to be separated.

Display Position Control

The display housing 60 is journalled for pivotal movement in the base or jamb 62, the latter being comprised of a metal casting containing integrally formed journals 100 and 102 (FIG. 11) disposed at opposite ends thereof and a cast metal cover 63 (not shown in FIG. 11) that closes the casting. In the journal 100 a pivot shaft 104, that is fixedly secured to the display housing 60 and that extends from one lateral end thereof, serves as the pivot axle. This shaft 104 possesses the supplemental function of guidingly attaching a flexible circuit strip 106 that provides the electrical connection between the CPU 12 and the display 14, the details of which attachment are described hereinafter. At its other end the housing 60 of display 14 is pivoted in the journal 102 by means of a pivot sleeve 108 which forms part of an apparatus, indicated generally as 109, for controlling the angular position of the display housing 60 with respect to the base 62. This position control apparatus 109 comprises an elongated cylindrical rod 110 formed of spring steel extending end-to-end between the lateral sides of the display assembly and received in a receptacle 112 formed in the display housing panel 68 adjacent the fastening pin 94 that secures the bottom edges of the housing panels 68 and 70. At one end the rod 110 contains a substantially perpendicular offset portion 114 that is received in a receptacle 116 formed by spaced projections cast along the side portion of the front panel 68. At its other end the rod 110 contains a substantially perpendicular offset portion 120 that, as shown in FIG. 6, is angularly offset about 80° with respect to the offset portion 114. The offset portion 120 is adapted to be received in a receptacle 122 (FIG. 11) formed in the base 62 by cast projections. It will be appreciated that the respective offset end portions 114 and 120 of the rod 110 serve to anchor opposite ends of the rod to the display housing 60 and base 62, respectively, so that the rod incurs torsional stressing during pivoting of the display housing with respect to the base.

The rod 110 is designed to contain a torsional pre-stress selected such that it is essentially zero psi when the display housing 60 is disposed about 10° beyond its vertical position with respect to the upper surface 32 of the CPU 12. When the display housing 60 is angularly displaced on opposite sides forwardly or rearwardly of this position, the torsional stress developed in the rod 110 in one direction or the other serves to counteract the gravitational effect of the display so as to reduce its effective weight. This facilitates manual movement of the display 14, and also reduces the amount of braking force required to retain the display in its respective angular positions as hereinafter described. Moreover, by disposing the position of zero prestress slightly beyond the vertical position of the housing, the stress profile is such that, when the latches 64 are actuated to release the housing 60 from the sides of the chassis 20, the housing will automatically spring to a slightly raised position above the upper surface of the chassis. This facilitates its being manually gripped for further manipulation.

Figure 7:
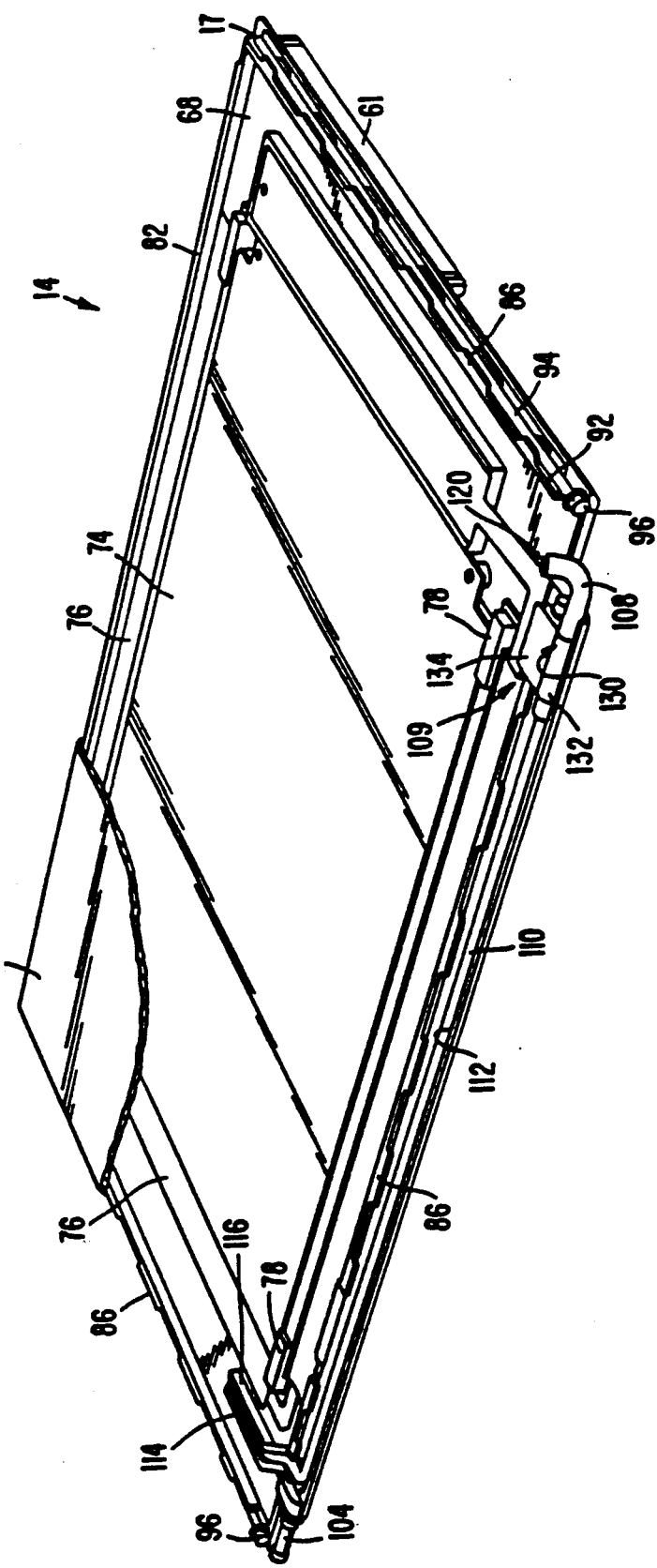
FIG. 7 is an isometric view of the computer display with the back cover partially cut away.

As shown best in FIGS. 6 and 7, the rod 110 telescopically receives the pivot sleeve 108 about the offset portion 120. The pivot sleeve 108, when assembled on the rod 110 extends beyond the end of the display panels, 68 and 70, and is received in the journal 122 provided in the casting forming the base 62, wherein it is anchored in place by the assembly of the cover 63 and whereby it forms the other display pivot axle.

Retention of the display housing 60 in its various angular positions is effected by a band brake 130. The band brake 130 is formed of resilient material, such as spring steel, and has a portion 132 formed as a segment of a cylinder that surrounds the pivot sleeve 108 about three-fourths of the way around its circumference. The brake 130 has divergent ends 134 that extend from the cylindrical portion 132 and, when constricted upon assembly of the display panels 68 and 70, cause the cylindrical portion to frictionally engage the pivot sleeve 108.

The friction retention force generated by the band brake 130 is effective to retain the display 60 in any angular position between its initial, slightly raised, unlatched position and its maximum full open position, thereby to enable adjustment of the display in any angular position between these positions. The display is held in its various angular positions principally by the friction force developed by the cylindrical portion 132 of the band brake 130 on the pivot sleeve 108. The torsion rod 110, besides being useful in reducing the gravitational effects of the display 14 and thereby the amount of effort required to move it, interacts with the band brake 130 to reduce significantly the amount of friction force necessary to be generated by the band brake for retaining the display. Therefore, the size of the respective elements required to retain the display is minimized such that the display housing structure required for their containment is small.

Circuit Strip Connector

The electrical interconnection between the CPU 12 and the display 14 is effected by a flat, flexible plastic circuit strip 106, of generally known construction, in which a plurality of electrical conductors are embedded. As shown in FIG. 11, the circuit strip 106 has one terminal end electrically connected to a multi-pronged terminal plug 138 centrally disposed in the base 62 of the display 14. The plug 138 is adapted for connection in a mating plug (not shown) that is accessible through opening 140 in the upper wall 32 of the CPU 12 which is closed by depressible, spring-biased closure covers 142. At its other terminal end the strip 106 is adapted for connection to one or more of the printed circuit boards 76.

As shown, the strip 106 contains a pair of parallel leg portions 142 and 144 and a nexus portion 146. One leg portion 144 extends to the nexus portion 146 from the terminal plug 138 and is fixedly secured in a track 148 formed in the base casting upon assembly of the base 62. The other leg portion 142 extends to the nexus portion 146 of the strip from that terminal end which is connected to the circuit board 76. The leg portion 142 is fixedly secured between the panels 68 and 70 that form the display housing 60 and is adapted to undergo movement with the housing when it is pivoted about the base 62.

In order to retain the circuit strip 106 such that its respective leg portions 142 and 144 can remain fixedly anchored, the former in the stationary base 62 and the latter in the display 14 that undergoes pivotal movement with respect to the base 62, there is provided a flex bushing 150 that defines the pivot shaft 104. The flex bushing 150 has a body having a generally cylindrical section 152 and a generally rectangular sided anchor section 154 separated by an enlarged diameter flange 156. The bushing 150 is retained between the display housing panels 68 and 70 with the anchor section 154 being seated in a cast receptacle in the panels so that the bushing remains stationary with respect to the display housing 60 for angular movement therewith. The cylindrical section 152 of the bushing body extends from an opening in the housing and is mounted for pivotal movement in the journal 100 formed in the casting defining the display base 62. This opening is effectively closed by the close proximity of the flange 156 on the bushing body to the opening. It will be appreciated that the bushing body thus forms the other pivot axle for the display 14.

As shown in FIG. 12, the body of bushing 150 extends in a direction transversely of the nexus portion 146 of the circuit strip 136, thus to grasp the strip 136 substantially along the longitudinal axis of the leg portion 142. Grasping of the strip 106 in this manner is effected by the fact that the bushing body contains a longitudinal slot 157 produced by the body's being fabricated in half sections that are joined by a flexible connector strip 158 that permits the sections to be folded upon each other. As a result of this construction, therefore, the attached portion of the strip 106 is retained on the bushing 150 by being sandwiched between the respective half sections. The cylindrical section 152 of the body is formed as a recess that is shouldered at each end, as shown at 160, within which recess the exposed part of the nexus portion 146 of the circuit strip 106 is wound as the bushing rotates in journal 100 upon pivotal movement of the display 14.

The action of the strip 106 formed by the nexus portion 146 is best illustrated in FIGS. 14 and 15, wherein it is evident that sufficient slack is made available in the strip to create an undulation or wave of sufficient longitudinal extent to permit the bushing body 150 to undergo about 135° of rotation in the journal 100 without applying undue tension to the strip material.

As is evident from observation of the drawing figures, as the bushing body 150 rotates with pivotal movement of the display 14, the material forming the nexus portion 146 of the circuit strip 106 winds upon the reduced diameter portion 152 of the bushing and is confined thereto by the shoulders 160 formed at the respective ends of the recess. By means of this construction the strip material is caused to undergo controlled movement as the display 14 moves with respect to the base 62, thereby preventing the creation of snarls in the strip that might create damage or breakage thereof or might, otherwise, cause a system malfunction.

Removable Display

Figure 16:
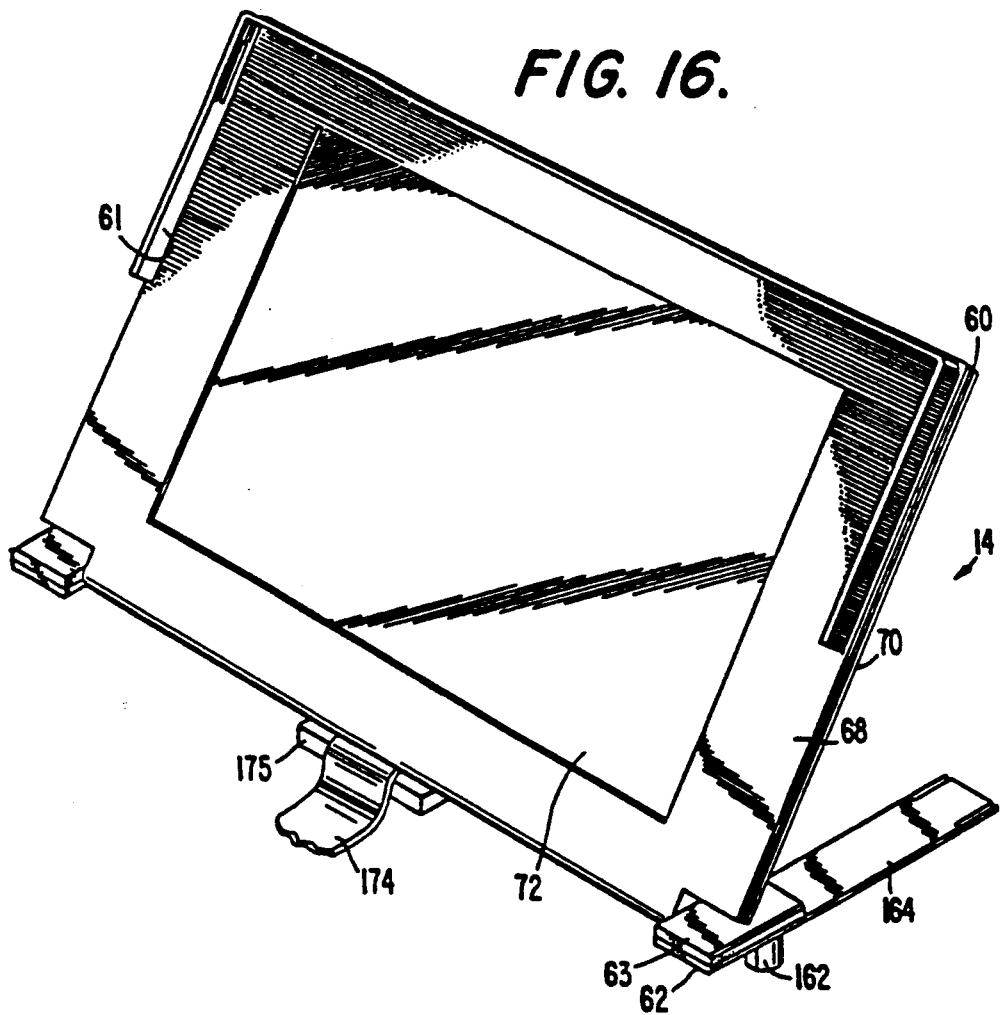
FIG. 16 is an isometric representation of the computer display in the detached, free-standing condition.
Figure 17:
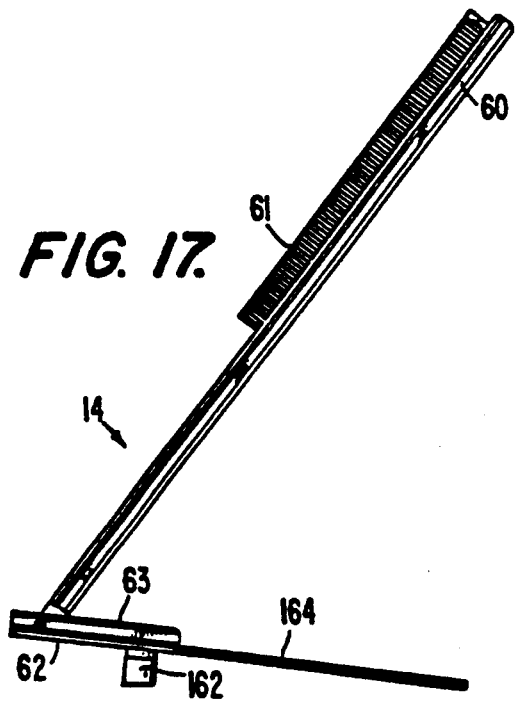
FIG. 17 is a side elevational view of the detached computer display.

In order to impart further versatility to the described computer apparatus, particularly when it is in a desktop operational mode, the display 14, including the housing 60 and base 62, can be completely detached from the CPU chassis 20 and made to be independently standing. This desirable feature is obtained by the provision, on the underside of the base 62 adjacent opposite ends thereof, of locking cams 162 fixedly attached to operating levers 164. As shown in FIGS. 16 and 17, the organization is such that, when the display 14 is detached from the CPU 12, the operating levers 164 of the locking cams 162 advantageously serve as support legs for the free standing assembly and the locking cams 162 serve as support feet to raise the front end of the assembly with respect to its back end. In this way a greater degree of inclination can be imparted to the display housing 60, to both enhance viewing of the projected graphics and to improve stability of the free standing structure by moving its center of gravity rearwardly.

The structural organization by which these features are obtained is described in connection with FIGS. 11 and 18 through 20. FIGS. 11 and 18 depict a plan view and a rear view, respectively, of the base 62 on which the locking cams 162 are mounted. As shown, the cams 162 comprise bodies having parallel, somewhat elongated, linear sides 166 and rounded, generally circular ends 168. The cam bodies are integrally formed on one end of the respective levers 164, with the assembly being connected for pivotal movement via a spring-biased fastener 163 to the casting forming the base 62. When the levers 164 are in their extended positions, and normal to the longitudinal axis of the base 62, the sides 166 of the cams 162 are caused to be aligned with the base axis. From this position, the levers 164 are rotatable 90° to be received in openings 169 formed in the base 62, whereupon the sides 166 of the cams 162 are made to be disposed perpendicular to the base axis, thus to effect a locking mode, as hereinafter explained.

With reference to FIGS. 3, 20 and 21, it is seen that the top wall 32 of the chassis 20 adjacent its rear end contains three openings, indicated as the centrally disposed plug opening 140 and openings 172 spaced on opposite sides of the central opening 140. As explained earlier, the central opening 140 provides access to a female terminal connector (not shown) for the terminal plug 138 located on the underside of the housing base 62. It will be appreciated that, when the display 14 is directly mounted on the computer chassis 20, the plug 138 attaches directly to the mating female connector in the chassis 20. When the display 14 is detached from the CPU chassis 20, however, an elongated electrical connector indicated as 174 in FIG. 16 is made to connect between the respective aforementioned terminal connectors. The electrical connector 174 may be arranged to carry a body 175 forming a foot for stabilizing the display 14 when it is separated from the computer 12.

Each of the openings 172 is, as shown, rectangular in shape and is closed by a flat closure plate 176 that is mounted in cantilever-fashion via a base 178 having openings that move along a pair of depending sleeved posts 180 and that is biased upwardly by means of springs 182 positioned between the head of the posts 180 in each pair and the base that moves therealong.

To attach the display 14 to the CPU chassis 20, the levers 164 are moved to their extended position perpendicular to the base axis. This positions the locking cams 162 with their sides 166 parallel to the base axis and in a position to be received by the respective openings 172 in the upper surface 32 of the chassis 20. The base 62 is caused to be moved downwardly toward the chassis top wall 32 such that the cams 162 simultaneously enter the openings 172 and the plug 138 enters the opening 140 pivoting the closures 142 open therein for connection of the plug 138 to the mating female plug. When the locking cams 162 are brought to bear on the plates 176 and, thereby depress them to their lower limit position the respective levers 164 are thereafter rotated to be moved into the elongated openings 169 formed in the display base 62. This action causes the locking cams 162 to rotate 90°, whereupon the elongated sides 166 of the cams are made to extend transversely beyond the short sides of the openings 172 thus to prevent withdrawal of the cams from the openings. The top surfaces 185 of the cams, upon rotation, are urged into locking engagement with the undersurface of the chassis top wall 32 by means of the curvature of the surface 185, thereby to securely attach the display 14 to the CPU 12.

Battery Pack

The computer apparatus 10 is equipped with a battery pack 16 of particular design that is releasable from attachment to the CPU 12 for recharging or for other purposes. The battery pack 16 comprises a plurality of rechargeable cells (not shown) that are housed within a container 186 of reduced vertical dimension having generally rectangular shaped, parallel upper and lower walls 188 and 190 that are interconnected by rectangularly arranged upstanding front, rear and oppositely spaced side walls 192, 194, 196 and 198, respectively. A contact assembly 199 formed of a plurality of resilient contact elements is here shown as being located adjacent the corner formed by the intersection of the rear wall 194 and side wall 196. The contact elements 199a of the assembly 199 are arranged to resiliently engage contact elements (199b) (FIG. 24) disposed on the chassis bottom wall 34 in overlying relation to the contact assembly on the battery pack 16 when in its latched, operative position.

Upstanding from the upper wall 188 are a plurality of hook-like securing members 200, here shown as being four in number and being positioned, two each along the respective side walls 196 and 198 and adjacent the respective corners thereof. As shown in FIG. 22, the securing members 200 are formed of generally flat bodies each having its longitudinal axis extending parallel to the adjacent battery side wall. The members 200 are adapted to be received in slots 20 provided in the bottom wall of the CPU chassis 20. The slots 201 have a shape corresponding to the sectional shape of the members 200, but are slightly elongated in the longitudinal direction and have their hook-forming openings 202 facing in the direction of the battery rear wall 194.

The particular shape of the securing members 200 dictates that, upon both installation and removal of the battery pack 16 to and from the bottom wall 34 of the chassis 20, there will be relative sliding contact between the contact elements 199a on the battery pack body 186 and the mating contacts 199b on the chassis bottom wall 34 so that damaging oxide accumulation on the respective contacts is prevented.

A releasable latching mechanism, indicated generally as 203, is employed to couple the battery pack 16 to the chassis 20 of CPU 12. The latching mechanism 203 comprises a depressible detent 204 that is adapted to be received in a mating slot 205 in the bottom wall 34 of the chassis. The detent 204 is integrally formed on an operator arm 206 having a composite shape that enables it to be retained within the battery pack container structure for pivotal movement; to be spring biased; and to be cam actuated within a restricted space. As shown, the operator arm 206 is formed of a sheet metal body that is housed within a cast portion 208 of the battery pack frame structure, from which the detent 204 is vertically extensible and retractable by pivotal movement of the operator arm. For pivoting, the operator arm 206 is formed at one end with a substantially circularly formed pivot portion 210 that rests in a pivot seat 212 of complementary shape in the cast portion 208. At its other end, the arm 206 contains a longitudinal extension 214, the bottom surface of which engages a spring 216 that is contained within a spring seat 218 in the cast portion 208 and that normally biases the engaged end of the arm upwardly. Intermediate its length the arm 206 possesses a cam surface 220 that is inclined upwardly in the direction of the detent 204 and adapted for reception of a movable boss 222 formed on an actuator slide 224.

As shown in FIGS. 26 and 27, the actuator slide 224 contains two laterally spaced body portions 226 and 228 joined by connector 227. The spacing between the body portions 226 and 228 and the position of the connector 227 therebetween is such as to permit the actuator slide 224 to be retained for longitudinal sliding movement on the battery pack frame structure. The body portion 226 containing the boss 222 also contains a post 232 to which one end of a spring 234 is attached. At its other end the spring 234 is attached to a post 236 on the cast portion 208 such that the actuator slide 224 is normally biased to its retracted position with the boss 222 positioned in the deepest part of the recess forming the cam surface 220 so that the detent 204 is normally located in its vertically extended position. The other actuator body portion 228 is disposed exteriorly of the battery pack container and may be provided with a knurled, or otherwise roughened surface, to facilitate its manual operation.

To remove the battery pack 16 from the chassis 20 of the CPU 12, the actuator 224 is manually moved to the right as it appears in FIGS. 22, 25 and 26 so as to pivotally depress the operator arm 206 and withdraw the detent 204 from the mating slot 205 in the CPU chassis. Withdrawal of the detent 204 from its mating slot 205 permits the battery pack 16, and thus the securing members 200, to be moved rearwardly for release of the members from the slots 201 in which they extend. This longitudinal movement of the battery pack with respect to the chassis 20 effects a sliding action of the contact elements 199a on the battery pack with the contact elements 199b on the chassis, thereby advantageously wiping any accumulated metal oxide from the surface of the respective contacts.

It will be appreciated that, to install the battery pack 16 on the CPU chassis 20, the detent 204 will, when the facing surfaces of the chassis and the battery pack bear against each other, be forced downwardly depressing the operator arm 206 against the spring 216. When the securing members 200 are positioned in the slots 201 in the chassis bottom wall 30 and the battery pack 16 moved forwardly, the detent 204, being upwardly biased by spring 216 will automatically enter the mating slot 205 to secure the battery pack to the chassis.

The facing surface 188 of the body 186 of the battery pack 16 contain recesses 230 formed and located to provide clearance for the respective feet 229 on the bottom surface 34 of computer chassis 20.

Chassis Closure Panel

Figure 28:
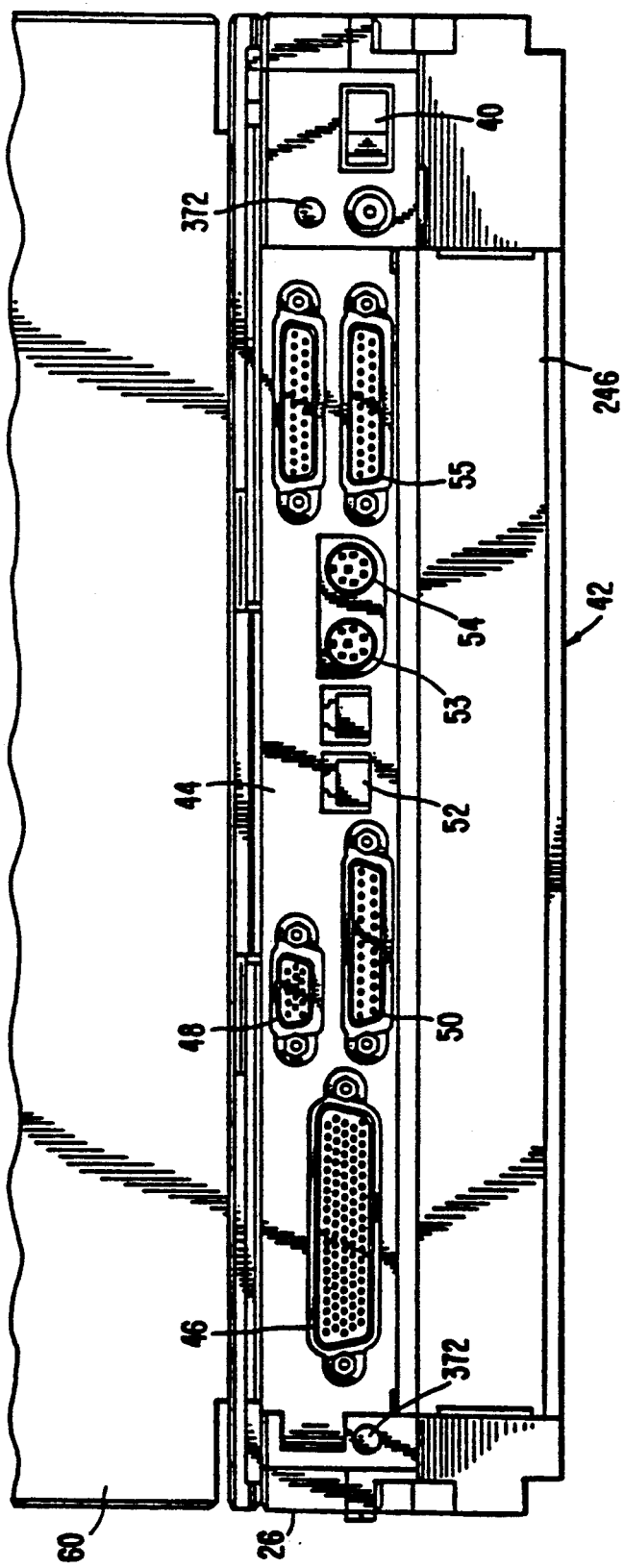
FIG. 28 is a partial rear elevational view of the computer apparatus with its rear end elevated.

As shown in FIGS. 5 and 28, the chassis 20 of CPU 12, in the region 44 of the rear wall 24, mounts the various aforementioned electrical connectors including principally the expansion bus connector 46, video connector 48, a connector 25 for a printer or the like, modem connections 52, and a keyboard connection 54. Other connections, such as that indicated as 53 for a mouse, and connector ports 55 to accommodate connection of other compatible apparatus can also be provided. Also disposed on the rear wall 24 is the computer power switch 40, the actuation of which activates the computer, either by power from the battery pack 16 or from an external power source.

Figure 29:
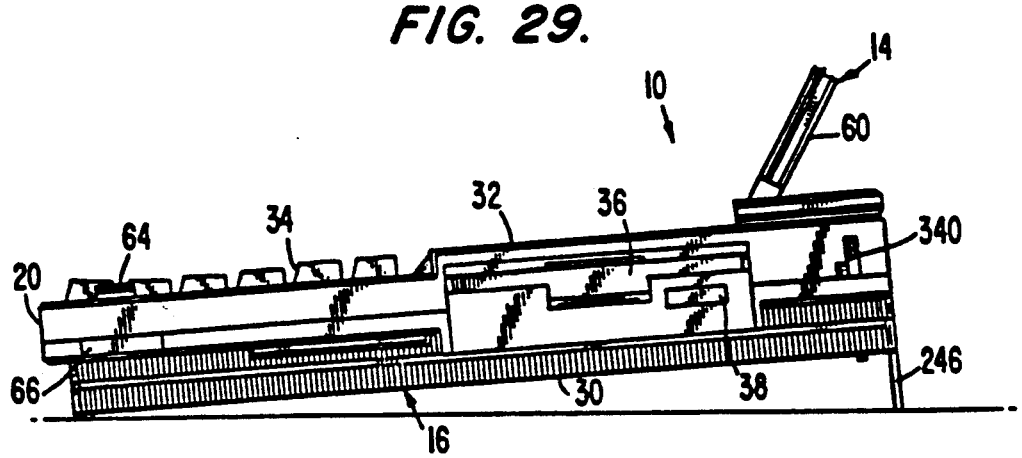
FIG. 29 is a partial side elevational view of the computer apparatus with its rear end elevated.

The region 44 of the rear wall that contains the respective electrical connector members 46 through 55 is made to be slightly recessed from the lateral end portions of the rear wall. Closing the recessed region 44 is a closure panel 42 formed by a plate 246, the external surface of which is substantially coplanar with the adjacent portions of the rear wall. The plate 246 is mounted via pivot pins 248 disposed at opposite ends of the panel lower portion and journalled in the facing sides 250 of the recess that forms region 44. The plate 246 is angularly displaceable through a range of movement of about 180°, from the vertically upright position shown in FIGS. 4 and 30, in which it serves to enclose and cover the region 44, to the vertically downturned position of FIGS. 28 and 29 in which the plate 246 serves as a support standard for raising the rear of the chassis 20, thereby to permit the CPU 12 to be supported in an inclined attitude, if desired.

The plate 246, as shown in FIG. 5, is also arranged to assume a third position, intermediate the other two positions, in which it is disposed substantially parallel to the bottom wall 32 of the CPU chassis 20. In this position the plate is effective to permit access to the various connectors in the region 44 of the chassis rear wall 24 with the chassis 20 oriented in an essentially horizontal position.

Mechanism is provided to effectively secure the plate 246 in each of its three operative positions. This mechanism comprises, at each opposite end of the plate 246 adjacent the pivot pins 248, a camming surface, indicated generally as 252, having four rectangularly disposed sides, three of which, indicated as sides 254, 256 and 258, are cam surfaces engageable by a spring biased follower 260. Each follower 260 comprises a pressing foot 262 that is separated by an enlarged shoulder 264 from a guide post 266. The pressing foot 262 on each follower is adapted to extend through an opening 268 in the chassis rear wall 24 in order to access the surface 252. The follower 260 is biased outwardly by a spring 270 that surrounds the guide post 266 and extends between the shoulder 264 and a spring retainer 272 integrally formed on, and upstanding from, the interior surface of the chassis bottom wall 30. The movement of the pressing foot 262 is guided by a pair of retainers 272 that are also upstanding from the interior surface of chassis wall 30.

Figure 30:
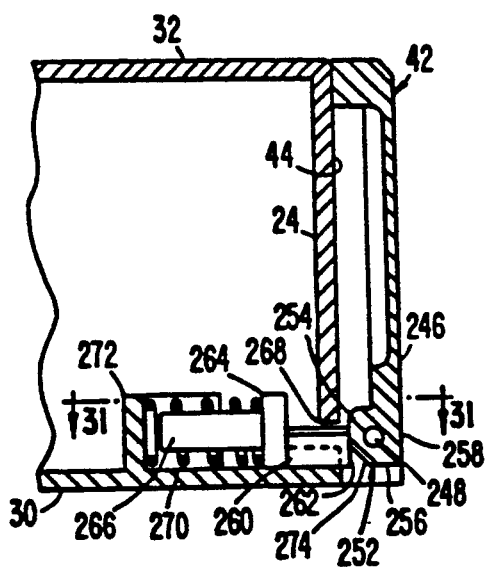
FIG. 30 is a partial side sectional view of the rear side of the chassis and closure panel.
Figure 31:
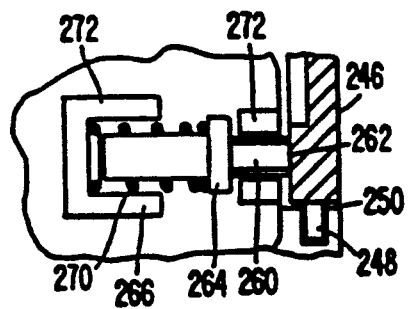
FIG. 31 is a partial plan view taken along line 31—31 of FIG. 30.

As shown in FIG. 30, the side 254 of the camming surface 252 of the cover 427 is engaged by the pressing foot 262 of the follower 260 with the closure plate 246 in its vertically upright position. The spring force imposed on the follower 260 by spring 270 is of the order of magnitude of about 50 pounds to, thus, secure the plate 246 in the selected position. As the plate 246 is moved to its other positions, the follower 260 is depressed against the spring 270, to be returned to pressing engagement with the surfaces 256 and 258 when the plate has been moved to dispose one or the other of the surfaces to a disposition normal to the axis of the pressing foot.

The camming surface 252 is advantageously arranged to permit relatively easy movement of the plate 246 between its vertically upright position and its intermediate position parallel to the chassis bottom wall 30. This relative ease of movement is effected by a depression 274 at the intersection of the sides 254 and 256. Such depression may be formed by either a curved surface extending between the two sides or, as shown, by a linear diagonal surface that intersects the two sides at about 45°.

As also shown in FIG. 30, the intersection between the sides 256 and 258 of camming surface 252 is maintained essentially at right angles. This is to increase the force required to depress the follower 260 and, concomitantly, the force necessary to move the plate 246 between its intermediate and its standard-forming position. More importantly, this device increases the retrograde force required to move the cover plate 246 between its standard-forming position back to its intermediate position, so as to reduce the danger of collapse of the support for the rear end of the chassis 20 when it is in its raised position.

Consequently, it will be appreciated that the configuration of the camming surface 252, in cooperation with the follower 260, is such as will permit relative ease of movement of the closure plate 246 from its position closing the recessed region 44 of the chassis rear wall 24 to its open position. The configuration of the camming surface 252 is also such as will render it difficult for the plate 246 to be accidently dislodged from its vertically downturned position, where a sudden collapse of the support standard could damage the computer apparatus.

Docking Module

Figure 32:
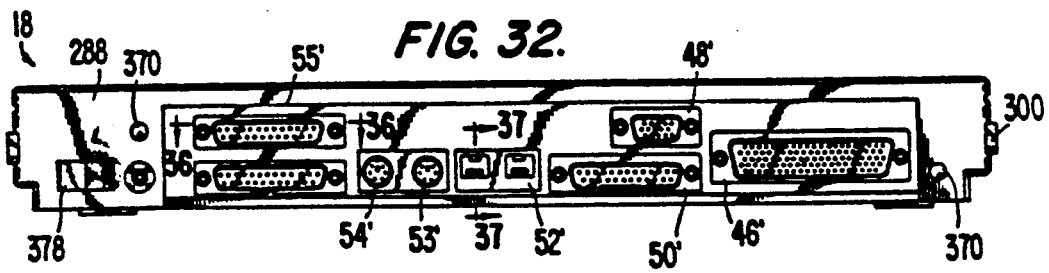
FIG. 32 is a front elevational view of the docking module.
Figure 33:
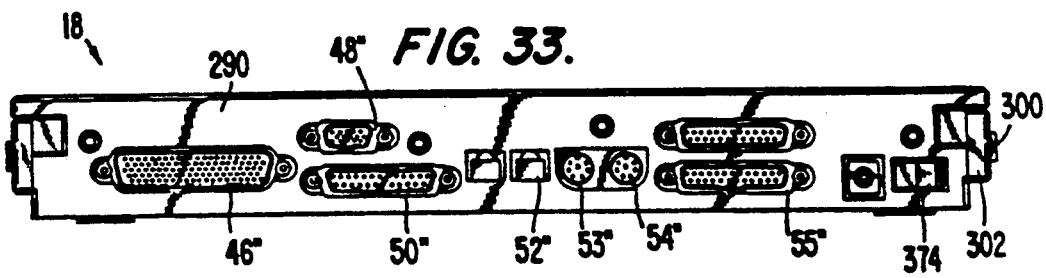
FIG. 33 is a rear elevational view of the docking module.

With particular reference to FIGS. 32 to 34, there is shown the docking module 18, whose function it is to effect connection between the computer chassis 20 and various pieces of ancillary equipment without the need for individual cable connections, thereby to facilitate conversion of the computer between its lap-top mode of operation and its desk-top operating mode. As shown, the docking module 18 comprises a metallic casing 283 formed by the assembly of an upper shell 284, a lower shell 286, a front bezel 288 and a rear bezel 290. The opposite side surfaces 292 and 294 of the docking module 18 are formed by the cooperation between perpendicularly offset wall portions such as those indicated as 286a and 286b that extend from the upper and lower shells 284 and 286, respectively. Mounted on the respective side surfaces 292 and 294 and separated from the interior region of the docking module by an arcuately formed shielding partition 295 are toggle latch mechanisms 296, each consisting principally of a latch hook 300, and a toggle lever 302, and each of which is formed of a rigid material. Since the sole structural difference existing between the respective toggle latch mechanisms 296 is the opposite facing disposition of the ripping projections 304 on the latch hooks 300 only one such toggle latch mechanism will be described in detail.

As shown in FIG. 35, the toggle lever 302 is a substantially U-shaped member having a body 306 containing oppositely spaced arms 308 and 310. The arms 308 and 310 adjacent their leading ends contain axially aligned pivot holes 312 adapted for reception on pins 314 which are integrally formed on the upper and lower shells 284 and 286, respectively, in oppositely facing relation to one another. The space between the arms 308 and 310 receives the latch hook 300 that is connected via a pivot pin 316 to the toggle lever 320 and that has formed thereon the inturned hook-like gripping projection 304.

Each toggle latch element is spring biased by a compound leaf spring assembly 318 that is fixedly attached at one end in a recess 320 integrally formed in standards 322 cast in the upper and lower shells 284 and 286, respectively. Each spring assembly 318 comprises a central spring element 324 whose free end is angularly offset and adapted to engage a cam element 326 formed on the rear end 328 of the latch hook 300 and operable to bias the end 328 outwardly and, thus, the leading end that contains the projection 304 inwardly.

Straddling the central spring element 324 is a lever spring 330 adapted at its free end to alternately engage angularly disposed cam surfaces 332 and 334 formed on a cam nose 336 that is integrally formed on the toggle lever body 306 extending between the arms 08 and 310. The disposition of the cam surfaces 332 and 334 on the cam nose 336 is such as, in cooperation with the lever spring 330, to biasly retain the lever 02 alternatively in its angularly outer or released position and in its latching or angularly inner position.

The toggle mechanisms 296 and 298 are arranged to secure the docking module 380 to the computer chassis 20 by the cooperation of the projections 304 on the latch hooks 300 with recessed depressions 340 (FIG. 29) formed on the left and right side walls 26 and 28 of the computer chassis 20 adjacent the rear ends thereof and formed to receive and grip the projections 304 so as to draw the docking module 18 and the computer chassis 20 toward each other and to secure them together.

Advantageously, the location of the respective depressions 340 vis-a-vis the toggle mechanisms 296 and 298 is such that the mechanisms operate to emit an audible signal when the projections 304 formed on the leading ends of the respective latch hooks 300 enter their respective associated depressions 340 to indicate that all of the complementary connectors on the docking module 18 and computer chassis 20 are properly aligned so as to permit actuation of the toggle levers 302 to draw the respective apparatus together and thereby further extend the pins on the male connectors into the receptacles on the female connectors without danger of damaging any of the connectors. The biasing force of the central spring elements 324 on the latch hooks 300 accordingly serve, not only to bias the projections 304 inwardly into the inserted relation with the depressions 340 but, do so with such force that an audible noise results which serves as the aforementioned signal.

As regards the configuration of the docking module casing structure, the face of the front bezel 288 mounts connectors that complement the connectors 46 through 55 mounted on the rear wall of the chassis 20. To assist connection of the respective complementary connectors, those connectors mounted on the front bezel 288 and indicated by the same numeral but with a prime superscript as the reference numeral that designates the connector on the CPU 12 with which it connects, are adapted to float to a limited degree by the provision of slightly oversized holes in which the respective connectors are mounted, thereby to impart a self-alignment feature to the concerned connectors.

Figure 36:
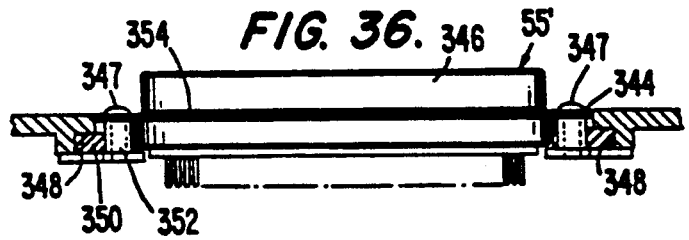
FIG. 36 is a view taken along line 36—36 of FIG. 32 illustrating one form of a docking module connector mounting.
Figure 37:
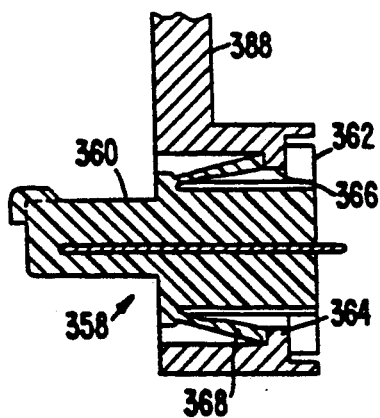
FIG. 37 is a view taken along line 37—37 of FIG. 32 illustrating another form of docking module connector mounting.

FIGS. 36 and 37 depict examples of the two typical forms of connector mountings existing in the docking module. In FIG. 36 is shown a multi-pin connector similar to the connector 55', adapted for reception in a mounting hole 344 of slightly oversized, conforming shape. The connector 55' comprises a frame 346 adapted for reception of screws 347 at the opposite lateral ends thereof. To receive the connectors the mounting hole 344 is provided with oppositely spaced lateral recesses 348 into which is inserted a flexible grommet 350 configured to fit snugly in the recess in concentric, surrounding relation to the neck of a tubular nut 352. The grommets 350 and nuts 352 are inserted into the recesses 348 in alignment with openings in a flange 354 for reception of screws 347.

FIG. 37 depicts another form of electrical connector 358 typically formed of plastic material whose body 360 is provided at one end with an outwardly extending flange 362 adapted to engage one side of the inturned flange 364 that extends about the periphery of the mounting hole 366 in the front bezel 288. Spaced rearwardly from, and extending toward, the flange 362 are a plurality of flexible fingers 368 whose gripping faces oppose the flange 362 and in cooperation therewith are adapted to engage the opposite side of the flange 364. Appropriate sizing of the hole 366 vis-a-vis the body 360 provides the connector 358 with a limited degree of float both horizontally and vertically on the docking module 18 thus to impart the connector with a self-alignment capability.

Assisting in the alignment of the electrical connectors on the docking module 18 with those on the chassis 20 are a pair of alignment pins 370 that are flexibly secured to the front bezel 288 by a spring or other flexible connection. The pins 370 are desirably disposed on laterally oblique spacing on the front bezel and extend forwardly from the surface thereof to be received in mating holes 372 formed in the chassis rear wall 24.

For accessing the power switch 40 on the chassis rear wall 24 from the rear bezel 290 on the docking module 18 when the docking module is operatively fixed to the computer chassis 20 is a pusher linkage 374 comprising an actuating lever 376 accessible from the rear face of the docking module and an operating lever 378 that protrudes through an opening in the front bezel 288 to engage the switch 40 on the CPU chassis 20. The levers 376 and 378 are each mounted for pivotal movement on pivot pins 380 and 382 upstanding from the front and rear edges, respectively, of the lower shell 286. A link 384 extends between and interconnects corresponding arms on the respective levers such that a pivoted action imposed on the actuating lever 376 will be directly imparted to the operating lever 378 and, concomitantly, to the power switch 40 on the computer chassis.

The operation of the described docking module 18 is as follows. In a typical application the docking module 18 will be disposed on a support surface at a location at which desk-top operation of the computer apparatus is intended. The electrical contact configuration on the rear bezel 290 of the docking module 18, as shown, substantially duplicates that on the rear wall 24 of the computer. Accordingly, each connector is identified by a corresponding reference numeral but bearing a double-prime superscript. To each of these connectors on the rear bezel 290 are connected via appropriate cabling the ancillary equipment intended for use with the computer 10. Such equipment may include a video apparatus, a printer, a modem, etc. It will be appreciated that cabling, once attached to the docking module 18, is intended to remain essentially permanently attached regardless of whether the computer 10 is attached to the docking module, or not.

The electrical connectors mounted on the front bezel 288 complement and are electrically connected to those on the rear bezel 290. They also complement those on the computer chassis rear wall 24. Consequently, the mating connection of the connectors on the computer chassis 20 to those on the docking module 18 will effectively connect the computer 10 to all apparatus from which cabling is extended and attached to the connectors on the docking module rear bezel 290. The effect of this is to greatly facilitate conversion of the computer from its lap-top or portable, operating mode to a desk-top mode, or vice-versa, in that the need to independently and individually make or break connections to the various equipment attached to the computer is eliminated. Instead, only a single connection need be made of the computer 10 to the docking module 18 that simultaneously effects all of the connections to be made.

Figure 38:
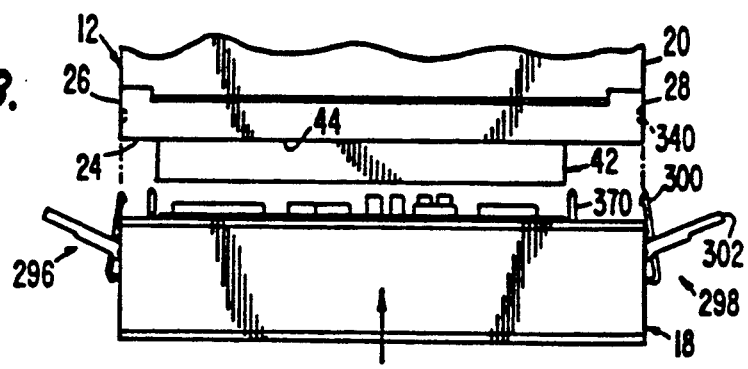
FIGS. 38 to 41 are partial plan views of the docking module and computer chassis illustrating various stages of the mounting procedure.
Figure 39:
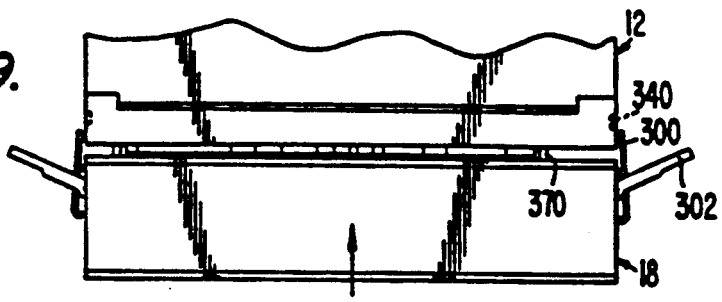
Figure 40:
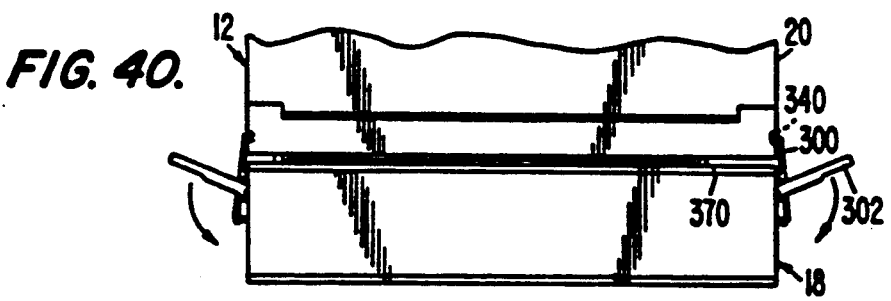

To attach the docking module 18 to the computer chassis 20, with the levers 302 disposed in their normally open position as shown in FIG. 38, the front of the docking module and the rear of the chassis are placed in a face-to-face relation and the alignment pins 370 on the docking module are caused to enter the mating holes 372 in the computer chassis 20 (FIG. 39). The computer chassis 20 and the docking module 18 are thereafter moved closer together with the projections 304 on the latch hooks 300 of the toggle latch mechanisms in sliding contact with the wall surfaces rearwardly of the depressions 340. Once the pins or other protrusions on the respective male connectors have been aligned with, and have initially penetrated the mating holes in the respective complementary connectors, the interstitial space between the docking module 18 and the computer chassis 20 is such that the projections 304 on the latch hooks 300 are caused to enter the depressions 340 in the chassis side walls 26 and 28. Moreover, because the latch hooks 300 are spring biased by the central spring elements 324, the projections 304 are caused to enter the depressions 340, as shown in FIG. 40, with sufficient force as to produce an audible signal indicating that proper alignment of all of the connectors has been made and that the toggle levers 302 may be actuated to draw the chassis 20 and docking module 18 closer together into tight final engagement without fear of damaging any of the connectors (FIG. 41).

By means of the disclosed toggle latch mechanisms 296 a manual five pound actuating force on the levers 302 produces about an eighty pound attachment force between the hook projections 304 and the engaged edges of the depressions 340 on the chassis. With the levers 302 in their latched position substantially parallel to the docking module side surfaces the spring force between the lever springs 330 on the surface 334 on the respective cam noses 336 serves to retain the levers in place. Thereafter, utilization of the computer can commence upon actuation of the power switch 40 via actuation of the pusher linkage 374.

Figure 41:
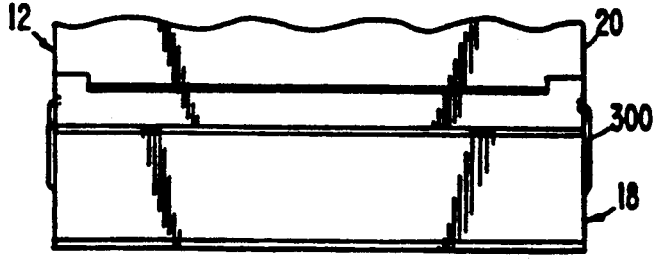

To detach the docking module 18 from the CPU chassis 20, the levers 302 are released from their locked position of FIG. 41, whereupon, in returning to their open position under the influence of the spring 330 the reactive force generated between the tip 303 of the hook 300 and the adjacent edge of the depression 340 in the chassis 20 effects a slight retrograde movement of the docking module from the chassis. To release the projection 304 from the depression 340, the lever 302 is moved slightly forwardly from its open position whereupon by action of the cam surface 305 on the front bezel 288 and the follower 307 on the hook 300, the latter is urged laterally outwardly from the depression so as to enable final separation of the docking module from the computer.

I will therefore be appreciated that the invention described herein and embodied in the claims hereof provides effective apparatus for controlling the pivotal movement of the display 14 with respect to the CPU 12 to enable the display to be retained in any angular position within its controlled range of movement on the CPU chassis thus to permit the user to adjustably position the display for the elimination of glare, or for other purposes. The apparatus is advantageously simple in design and compact of form so as to permit its being contained within the display housing without requiring any enlargement of the housing to accommodate the presence of the apparatus.

It should be further understood that, although a preferred embodiment of the invention has been illustrated and described herein, changes and modifications can be made in the described arrangement without departing from the scope of the appended claims.

What is claimed is:

1. A portable computer assembly comprising:
   computer base means including base connector means,
   display means adapted and arranged to be removably attached to said base means so as to be pivotable with respect thereto; said display means including deployable support means and also including display-connect means adapted for detachable electrical connection with said base connector means whereby to receive electrical signals therefrom; said display means being arranged and adapted to be disconnected from said base means and said base connector means and placed in independent free-standing condition; and
   extended-length electrical cable means adapted for removable connection between said base connector means and said display connect means when said display means is removed from mounting on said base means and is set in independent free-standing condition remote from said computer base means;
   said base means including means for so pivotably mounting said display means thereon;
   said display means further including display-base means including said display-connect means and pivotably deployable support feet means facilitating said free-standing condition.

2. The assembly of claim 1 wherein said support feet are pivotably secured to said display-base means; and further including means for pivotably moving said feet into stowed-condition in said display-base means.

3. A computer assembly comprising:
   a main housing including a central processor means;
   connect-plug means for receiving display connector means, and display mounting means for receiving detachable display means and accommodating pivoting movement thereof;
   display means comprising a base, a display housing attached to said base and including display screen means, display-connect means mounted on said base, and electrically connected to said screen means and adapted to be detachably connected with said connect-plug means; and pivot means arranged for removable mounting on said mounting means of said main housing; said display means being further adapted to be placed in independent, free-standing condition remote from said housing, with cable means fitting into said connect-plug means and said display-connect means whereby to electrically interconnect said display means and said central processor means; said display means also including display-base means including said display-connect means and pivotably deployable support feet means facilitating said free-standing condition.

4. Two-way display means adapted to be removably mounted upon associated computer housing means, and electrically-connected thereto, while also being adapted for independent, free-standing operation remote from said housing means, said housing means including computer base means with base connector means,
   said display means including pivoting deployable support means, being adapted and arranged to be removably attached to said base means so as to be pivotable with respect thereto; said display means including display - connect means adapted for detachable electrical connection with said base connector means whereby to receive electrical signals therefrom; said display means being arranged and adapted to be disconnected from said base means and said base connector means and placed in independent free-standing condition.

5. The display means of claim 4 including:
   electrical interconnect means adapted for selective connection of said base connector means with said display connect means when said display means is removed from mounting on said base means and is set in independent free-standing condition remote from said computer base means.

6. A portable computer assembly comprising:
   computer base means including base connector means;
   display means adapted and arranged to be removably attached to said base means so as to be pivotable with respect thereto; said display means including auxiliary support means and display-connect means adapted for detachable electrical connection with said base connector means whereby to receive electrical signals therefrom; said display means being arranged and adapted to be disconnected from said base means and said base connector means and placed in independent free-standing condition; and electrical interconnect means adapted for selective inter-connection of said base connector means with said display connect means when said display means is removed from mounting on said base means and is set in independent free-standing condition remote from said computer base means; said auxiliary support means being selectively deployable when said display means assumes free-standing condition.

7. A portable computer assembly comprising: computer base means including base connector means, display means, display means adapted and arranged to be removably attached to said base means so as to be pivotable toward and away from said base means; said display means including display-connect means adapted for detachable electrical connection with said base connector means whereby to receive electrical signals therefrom; said display means being arranged and adapted to be disconnected from said base means and said base connector means and placed in independent free-standing operating condition;
   said display means also including display-connect means and auxiliary support means for support thereof in said free-standing condition; said support means being, then, adapted to move relative to the rest of said display means, into a position which supports said display means; and extended-length electrical cable means adapted for removable connection between said base connector means and said display connect means when said display means is removed from mounting on said base means and is set in independent free-standing condition remote from said computer base means.

8. The assembly of claim 7 wherein said base means includes means for so pivotably mounting said display means thereon.

9. A computer assembly comprising: a main housing including central processor means; connect-plug means for receiving display connector means, and display mounting means for receiving detachable display means and accommodating pivoting movement thereof;

display means comprising display base means, a display housing attached to said base means and including display screen means, auxiliary screen support means, and display-connect means mounted on said base, and electrically connected to said screen means and adapted to be detachably connected with said connect-plug means; and pivot means arranged for removable mounting on said mounting means of said main housing and accommodating said pivoting of said display means toward and away from said housing; said display means being further adapted to be placed in independent, free-standing condition remote from said housing, with cable means removably fitting into said connect-plug means and said display-connect means whereby to electrically interconnect said display means and said central processor means;

said display-base means including said display-connect means with deployable support means including support feet pivotably-deployable to facilitate said free-standing condition.

10. The assembly of claim 9 wherein said display screen support means is selectively deployable only when said display means is free standing.

11. The assembly of claim 9 wherein said support feet are pivotably secured to said display-base means; and further including means for pivotably moving said feet into stowed-condition in said display-base means.

12. A portable computer assembly comprising: computer base means including base connector means, display means adapted and arranged to be removably attached to said base means so as to be pivotable toward and away from said base means; said display means including display-connect means adapted for detachable electrical connection with said base connector means whereby to receive electrical signals therefrom; said display means being arranged and adapted to be disconnected from said base means and said base connector means and placed in independent free-standing condition and including auxiliary support means which move, relative to the rest of said display means into a position for support thereof in said free-standing condition; and extended-length electrical cable means adapted for removable connection between said base connector means and said display connect means when said display means is removed from mounting on said base means and is set in independent free-standing condition remote from said computer base means.

13. The assembly of claim 12 wherein said display means includes display-base means including said display-connect means and deployable support means separate from said cable means facilitating said free-standing condition.

14. The assembly of claim 13 wherein said support means comprises support feet deployable for said free-standing condition.

15. A computer assembly comprising: a main housing including central processor means; connect-plug means for receiving display connector means, and display mounting means for receiving detachable display means and accommodating pivoting movement thereof;

display means comprising a base, a display housing attached to said base and including display screen means, auxiliary screen support means, and display-connect means mounted on said base, and electrically connected to said screen means and adapted to be detachably connected with said connect-plug means; and pivot means arranged for removable mounting on said mounting means of said main housing and accommodating said pivoting of said display means toward and away from said housing; said display means being further adapted to be placed in independent, free-standing condition remote from said housing, with cable means removably fitting into said connect-plug means and said display-connect means whereby to electrically interconnect said display means and said central processor means; said support means being, then, adapted to move relative to the rest of said display means, into a position which supports said display means.

16. The assembly of claim 15 wherein said display screen support means is selectively deployable only when said display means is free standing.

17. A portable computer assembly comprising: computer base means including base connector means, and display means adapted and arranged to be removably attached to said base means so as to be pivotable toward and away from said base means; said display means including auxiliary support means and display-connect means adapted for detachable electrical connection with said base connector means whereby to receive electrical signals therefrom; said display means being arranged and adapted to be disconnected from said base means and said base connector means and placed in independent free-standing condition; and interconnect means adapted to selectively connect said base connector means, electrically, with said display connect means; said support means being selectively deployable to move, relative to the rest of said display means and when said display means is free-standing into a support position.

18. The assembly of claim 17 also including:

extended-length electrical cable means adapted for removable connection between said base connector means and said display connect means when said display means is removed from mounting on said base means and is set in independent free-standing condition remote from said computer base means.

19. Two-way display means adapted to be removably mounted upon associated computer housing means, and electrically-connected thereto, while also being adapted for independent, free-standing operation remote from said housing means, said housing means including computer base means with base connector means, said display means being adapted and arranged to be removably attached to said base means so as to be pivotable toward and away from said base means; said display means including auxiliary support means and display-connect means adapted for detachable electrical connection with said base connected means whereby to receive electrical signals therefrom; said display means being arranged and adapted to be disconnected form said base means and said base connector means and placed in independent free-standing condition; and interconnect means adapted to selectively connect said base connector means, electrically, with said display connect means; said support means being selectively deployable and movable relative to said display means, when said display means is free-standing, into a position supporting said display means.

20. The display means of claim 19 including:

extended-length electrical cable means adapted for removable connection between said base connector means and said display connect means when said display means is removed from mounting n said base means and is set in independent free-standing condition remote from said computer base means.

* * * * *